United States Patent [19]
Kennedy et al.

[11] Patent Number: 5,330,849
[45] Date of Patent: Jul. 19, 1994

[54] COMPOSITE MATERIALS AND METHODS FOR MAKING THE SAME

[75] Inventors: Christopher R. Kennedy; Birol Sonuparlak, both of Newark; Ali S. Fareed, Wilmington; John E. Garnier, Newark; Gerhard H. Schiroky, Hockessin, all of Del.

[73] Assignee: Lanxide Technology Company, LP, Newark, Del.

[21] Appl. No.: 862,397

[22] Filed: Apr. 2, 1992

Related U.S. Application Data

[63] Continuation-in-part of Ser. No. 61,854, Jun. 12, 1987, Pat. No. 5,202,859.

[51] Int. Cl.$^5$ .............................. B22F 5/00; B05D 5/00
[52] U.S. Cl. .................................... 428/552; 428/446; 427/198; 252/389.31; 252/400.31; 252/400.41
[58] Field of Search ............... 252/389.31, 387.41, 252/400.31, 400.41; 428/446, 552; 427/198

[56] References Cited

U.S. PATENT DOCUMENTS

| | | | |
|---|---|---|---|
| 2,741,822 | 4/1956 | Udy | 25/157 |
| 3,255,027 | 6/1966 | Talsma | 106/65 |
| 3,296,002 | 1/1967 | Hare | 106/40 |
| 3,298,842 | 1/1967 | Seufert | 106/65 |
| 3,419,404 | 12/1968 | Mao | 106/65 |
| 3,421,863 | 1/1969 | Bawa et al. | 29/182.5 |
| 3,437,468 | 4/1969 | Seufert | 51/298 |
| 3,473,938 | 10/1969 | Oberlin | 106/57 |
| 3,473,987 | 10/1969 | Sowards | 156/89 |
| 3,789,096 | 1/1974 | Church | 264/60 |
| 3,864,154 | 2/1975 | Gazza et al. | 29/123 B |
| 3,895,084 | 7/1975 | Bauer | 264/29 |
| 3,973,977 | 8/1976 | Wilson | 106/62 |
| 3,991,248 | 11/1976 | Bauer | 428/245 |
| 4,131,697 | 12/1978 | Randon et al. | 427/249 |
| 4,275,095 | 6/1981 | Warren | 427/228 |
| 4,397,901 | 8/1983 | Warren | 428/101 |
| 4,405,685 | 9/1983 | Honjo et al. | 428/368 |
| 4,426,209 | 1/1984 | Sarin et al. | 428/404 X |

(List continued on next page.)

FOREIGN PATENT DOCUMENTS

| | | |
|---|---|---|
| 69835 | 7/1991 | Australia. |
| 0116809 | 8/1984 | European Pat. Off.. |
| 0155831 | 9/1985 | European Pat. Off.. |
| 0169067 | 1/1986 | European Pat. Off.. |

OTHER PUBLICATIONS

"Advanced Ceramic Matrix, Metal Matrix and Carbon-Carbon Composites"-Dr. John Briggs-Materials Technology Publications.

"Oxidation of Molten Aluminum Alloys, Reaction with Refractories"-M. Drouzy and M. Richard-Mar. 1974 Fonderie, France No. 332 pp. 121-128.

"Refractories for Aluminum Alloy Melting Furnaces'-'-B. Clavaud and V. Jost-Sep., 1980-Lillian Brassinga (from French) Jan., 1985.

*Primary Examiner*—Peter A. Nelson
*Attorney, Agent, or Firm*—Mark G. Mortenson; Jeffrey R. Ramberg

[57] ABSTRACT

The present invention generally relates to mechanisms for preventing undesirable oxidation (i.e., oxidation protection mechanisms) of reinforcement materials in composite bodies. The oxidation protection mechanisms include getterer materials which are added to the composite body which gather or scavenge undesirable oxidants which may enter the composite body. The getterer materials may be placed into at least a portion of the matrix such that any desirable oxidant approaching, for example, a fiber reinforcement, would be scavenged by (e.g., reacted with) the getterer. Ceramic filler materials which serve as reinforcements may have a plurality of super-imposed coatings thereon, at least one of which coatings may function as a getterer. The coated materials may be useful as reinforcing materials in ceramic matrix composites to provide improved mechanical properties such as fracture toughness. The present invention also relates to improved composites which incorporate these materials, and to their methods of manufacture.

21 Claims, 14 Drawing Sheets

U.S. PATENT DOCUMENTS

| | | | |
|---|---|---|---|
| 4,472,476 | 9/1984 | Veltri et al. | 428/215 |
| 4,491,482 | 1/1985 | Honi | 428/404 X |
| 4,515,860 | 5/1985 | Holzl | 428/408 |
| 4,567,103 | 1/1986 | Sara | 428/698 X |
| 4,582,751 | 4/1986 | Vasilos et al. | 428/307 |
| 4,593,007 | 6/1986 | Novinski | 428/404 X |
| 4,605,588 | 8/1986 | Simpson et al. | 428/288 |
| 4,618,525 | 10/1986 | Chamberlain et al. | 428/698 X |
| 4,642,271 | 2/1987 | Rice | 428/698 |
| 4,668,590 | 5/1987 | Yamamoto et al. | 428/699 X |
| 4,752,503 | 6/1988 | Thebault | 427/248 |
| 4,766,013 | 8/1988 | Warren | 427/228 |
| 4,863,773 | 9/1989 | Rousseau et al. | 428/68 |
| 4,863,798 | 9/1989 | Arenz et al. | 428/368 |
| 4,885,199 | 12/1989 | Corbin et al. | 428/113 |
| 4,944,904 | 7/1990 | Singh et al. | 269/60 |
| 4,981,822 | 1/1991 | Singh et al. | 501/95 |
| 5,017,526 | 5/1991 | Newkirk et al. | 501/89 |
| 5,026,604 | 6/1991 | Thebault | 428/367 |
| 5,094,901 | 3/1992 | Gray | 428/141 |
| 5,198,152 | 3/1993 | Liimatta et al. | 252/389.31 |
| 5,202,059 | 4/1993 | Kennedy | 252/389.31 |

COMPOSITE MATERIALS AND METHODS FOR MAKING THE SAME

The United States Government has some rights to certain aspects of this invention pursuant to Contract No. N00014-90-C-0160 between the Defense Advanced Research Projects Agency and Lanxide Corporation.

CROSS-REFERENCE TO RELATED PATENT APPLICATION

This application is a continuation-in-part application of U.S. patent application Ser. No. 07/061,854, filed on Jun. 12, 1987 and now U.S. Pat. No. 5,202,859, in the name of Christopher R. Kennedy.

FIELD OF THE INVENTION

The present invention generally relates to mechanisms for preventing undesirable oxidation (i.e., oxidation protection mechanisms) of reinforcement materials in composite bodies. The oxidation protection mechanisms include getterer materials which are added to the composite body which gather or scavenge undesirable oxidants which may enter the composite body. The getterer materials may be placed into at least a portion of the matrix such that any desirable oxidant approaching, for example, a fiber reinforcement, would be scavenged by (e.g., reacted with) the getterer. Ceramic filler materials which serve as reinforcements may have a plurality of super-imposed coatings thereon, at least one of which coatings may function as a getterer. The coated materials may be useful as reinforcing materials in ceramic matrix composites to provide improved mechanical properties such as fracture toughness. The present invention also relates to improved composites which incorporate these materials, and to their methods of manufacture.

BACKGROUND OF THE INVENTION

A ceramic composite is a heterogeneous material or article comprising a ceramic matrix and filler such as ceramic particles, fibers or whiskers, which are intimately combined to achieve desired properties. These composites are produced by such conventional methods as hot pressing, cold pressing and firing, hot isostatic pressing, and the like. However, these composites typically do not exhibit a sufficiently high fracture toughness to allow for use in very high stress environments such as those encountered by gas turbine engine blades.

A novel and useful method for producing self-supporting ceramic composites by the directed oxidation of a molten precursor metal is disclosed in Commonly Owned U.S. Pat. No. 4,851,375, which issued on Jul. 25, 1989, described below in greater detail. However, the processing environment is relatively severe, and there is a need, therefore, to protect certain fillers from the strong oxidation environment. Also, certain fillers may be reduced at least partially by molten metal, and therefore, it may be desirable to protect the filler from this local reducing environment. Further, the protective means should be conducive to the metal oxidation process, yet not degrade the properties of the resulting composite, and even more desirably provide enhancement to the properties. Still further, in some instances it may be desirable for the means or mechanisms for protecting the filler during matrix or composite formation to also protect the fillers against undesirable attack of oxidants diffusing through the matrix during actual service of the composite.

It is known in the art that certain types of ceramic fillers serve as reinforcing materials for ceramic composites, and the selection or choice of fillers can influence the mechanical properties of the composite. For example, the fracture toughness of the composite can be increased by incorporating certain high strength filler materials, such as fibers or whiskers, into the ceramic matrix. When a fracture initiates in the matrix, the filler debonds from the matrix and spans the fracture, thereby resisting or impeding the progress of the fracture through the matrix. Upon the application of additional stress, the fracture propagates through the matrix, and the filler begins to fracture in a plane different from that of the matrix, pulling out of the matrix and absorbing energy in the process. Pull-out is believed to increase certain mechanical properties such as work-of-fracture by releasing the stored elastic strain energy in a controlled manner through friction generated between the material and the surrounding matrix.

Debonding and pull-out have been achieved in the prior art by applying a suitable coating to the ceramic filler material. The coating is selected so as to have a lower bonding strength with the surrounding matrix than the filler, per se, would have with the matrix. For example, a boron nitride coating on silicon carbide fibers has been found to be useful to enhance pull-out of the fibers. Representative boron nitride coatings on fibers are disclosed in U.S. Pat. No. 4,642,271, which issued on Feb. 10, 1987, in the name of Roy W. Rice, and are further disclosed in U.S. Pat. No. 5,026,604, which issued on Jun. 25, 1991, in the name of Jacques Thebault. However, the use of boron nitride coated fibers in composites may present significant processing disadvantages. For example, the production of ceramic matrix composites containing boron nitride coated materials requires the use of reducing atmospheres since a thin layer of boron nitride readily oxidizes at temperatures above 800°–900° C. A reducing atmosphere, however, may often times not be compatible with the directed oxidation of molten precursor metal for fabricating ceramic composites. Further, in the directed oxidation process the coating desirably is compatible with the molten metal in that the molten metal wets the coated filler under the process conditions, for otherwise the oxidation process and matrix growth may be impeded by the filler.

Also, in order to prevent or minimize filler degradation, certain limits may be imposed on the conventional fabrication processes, such as using low processing temperatures or short times at processing temperature. For example, certain fillers may react with the matrix of the composite above a certain temperature. Coatings have been utilized to overcome degradation, but as explained above, the coating can limit the choice of processing conditions. In addition, the coating must be compatible with the filler and with the ceramic matrix.

A need therefore exists to provide coated ceramic filler materials which are capable of debonding and pull-out from a surrounding ceramic matrix. A further need exists to provide coated ceramic filler materials which may be incorporated into the ceramic matrix at elevated temperatures under oxidizing conditions to provide composites exhibiting improved mechanical properties such as increased fracture toughness.

In order to meet one or more of these needs, the prior art shows filler materials bearing one or more coatings.

Carbon is a useful reinforcing filler but typically is reactive with the matrix material. It therefore is well known in the art to provide the carbon fibers with a protective coating. U.S. Pat. No. 4,397,901, which issued on Aug. 9, 1983, in the name of James W. Warren, teaches first coating carbon fibers with carbon as by chemical vapor deposition, and then with a reaction-formed coating of a metallic carbide, oxide, or nitride. Due to a mismatch in thermal expansion between the fiber and the coating, the fiber is capable of moving relative to the coating to relieve stress. A duplex coating on carbon fibers is taught by U.S. Pat. No. 4,405,685, which issued on Sep. 20, 1983, in the names of Honjo et al. The coating comprises a first or inner coating of a mixture of carbon and a metal carbide and then an outer coating of a metal carbide. The outer coatings prevent degradation of the fiber due to reaction of unprotected fiber with the matrix material, and the inner coating inhibits the propagation of cracks initiated in the outer layer. U.S. Pat. No. 3,811,920, which issued on May 21, 1974, in the names of Galasso et al. relating to metal matrix composites, discloses coated fibers as a reinforcing filler, such as boron filaments having a silicon carbide surface layer and an additional outer coating of titanium carbide. This reference teaches that the additional coating of titanium carbide improves oxidation resistance as well as provides a diffusion barrier between the filament and metal matrix.

However, the prior art fails to teach or suggest filler materials with a duplex coating for protection from and compatibility with a molten metal in an oxidizing environment during manufacture of the ceramic matrix composite by directed oxidation, and yet in the composite exhibit debonding and pull-out from the surrounding matrix. Moreover, the prior art does not recognize certain important aspects of utilizing getterer materials which function to scavenge undesirable oxidants, and after such scavenging has occurred, forming desirable compounds or materials (e.g., one or more glassy compounds) which assist in protecting the reinforcement materials from undesirable oxidation.

DESCRIPTION OF COMMONLY OWNED PATENT APPLICATIONS

The filler materials utilized in this invention may be protected by a number of different mechanisms in a number of different composite bodies. Filler materials containing a coating or plurality of coatings, in accordance with the teachings of this invention, are particularly applicable or useful in the production of ceramic composites disclosed and claimed in Commonly Owned U.S. Pat. No. 4,851,375, entitled "Methods of Making Composite Ceramic Articles Having Embedded Filler," which issued on Jul. 25, 1989, from U.S. patent application Ser. No. 819,397, filed Jan. 17, 1986, which is a continuation-in-part of Ser. No. 697,876, filed Feb. 4, 1985 (now abandoned), both in the names of Marc S. Newkirk et al. and entitled "Composite Ceramic Articles and Methods of Making Same". This Commonly Owned Patent discloses a novel method for producing a self-supporting ceramic composite by growing an oxidation reaction product from a precursor metal or parent metal into a permeable mass of filler.

The method of growing a ceramic product by an oxidation reaction of a parent metal is disclosed generically in Commonly Owned U.S. Pat. No. 4,713,360, which issued on Dec. 15, 1987, from U.S. patent application Ser. No. 818,943, filed Jan. 15, 1986 as a continuation-in-part of Ser. No. 776,964, filed Sep. 17, 1985 (now abandoned), which is a continuation-in-part of Ser. No. 705,787, filed Feb. 26, 1985 (now abandoned), which is a continuation-in-part of Ser. No. 591,392, filed Mar. 16, 1984 (now abandoned), all in the name of Marc S. Newkirk et al. and entitled "Novel Ceramic Materials and Methods of Making Same" and in U S. Pat. No. 4,853,352, which issued on Aug. 1, 1989, from U.S. Ser. No. 07/220,935, filed Jun. 23, 1988, which is a continuation application of U.S. Ser. No. 822,999, filed Jan. 27, 1986, which is a continuation-in-part of Ser. No. 776,965, filed Sep. 17, 1985 (now abandoned), which is a continuation-in-part of Ser. No. 747,788, filed Jun. 25, 1985 (now abandoned), which is a continuation-in-part of Ser. No. 632,636, filed Jul. 20, 1984 (now abandoned), all in the names of Marc S. Newkirk et al. and entitled "Methods of Making Self-Supporting Ceramic Materials".

The entire disclosures of each of the Commonly Owned Patents and Patent Applications are incorporated herein by reference.

Commonly Owned U.S. Pat. No. 4,713,360 discloses a novel method for producing a self-supporting ceramic body by oxidation of a parent metal (as defined below) to form an oxidation reaction product which then comprises the ceramic body. More specifically, the parent metal is heated to an elevated temperature above its melting point but below the melting point of the oxidation reaction product in order to form a body of molten parent metal which reacts upon contact with a vapor-phase oxidant to form an oxidation reaction product. The oxidation reaction product, or at least a portion thereof which is in contact with and extends between the body of molten parent metal and the oxidant, is maintained at the elevated temperature, and molten metal is drawn through the polycrystalline oxidation reaction product and towards the oxidant, and the transported molten metal forms oxidation reaction product upon contact with the oxidant. As the process continues, additional metal is transported through the polycrystalline oxidation reaction product formation thereby continually "growing" a ceramic structure of interconnected crystallites. Usually, the resulting ceramic body will contain therein inclusions of nonoxidized constituents of the parent metal drawn through the polycrystalline material and solidified therein as the ceramic body cooled after termination of the growth process. As explained in these Commonly Owned Patents, resultant novel ceramic materials are produced by the oxidation reaction between a parent metal and a vapor phase oxidant, i.e., a vaporized or normally gaseous material, which provides an oxidizing atmosphere. In the case of an oxide as the oxidation reaction product, oxygen or gas mixtures containing oxygen (including air) are suitable oxidants, with air usually being preferred for obvious reasons of economy. However, oxidation is used in its broad sense in the Commonly Owned Patents and in this application, and refers to the loss or sharing of electrons by a metal to an oxidant which may be one or more elements and/or compounds. Accordingly, elements other than oxygen may serve as the oxidant. In certain cases, the parent metal may require the presence of one or more dopants in order to influence favorably or to facilitate growth of the ceramic body, and the dopants are provided as alloying constituents of the parent metal. For example, in the case of aluminum as the parent metal and air as the oxidant, dopants such as magnesium and silicon, to name but two of a larger class of dopant materials, are alloyed with the aluminum alloy utilized as the parent metal.

The aforementioned Commonly Owned U.S. Pat. No. 4,853,352 discloses a further development based on the discovery that appropriate growth conditions as described above, for parent metals requiring dopants, can be induced by externally applying one or more dopant materials to the surface or surfaces of the parent metal, thus avoiding the necessity of alloying the parent metal with dopant materials, e.g. metals such as magnesium, zinc and silicon, in the case where aluminum is the parent metal and air is the oxidant. External application of a layer of dopant material permits locally inducing metal transport through the oxidation reaction product and resulting ceramic growth from the parent metal surface or portions thereof which are selectively doped. This discovery offers a number of advantages, including the advantage that ceramic growth can be achieved in one or more selected areas of the parent metal's surface rather than indiscriminately, thereby making the process more efficiently applied, for example, to the growth of the ceramic plates by doping only one surface or only portions of a surface of a parent metal plate. This improvement invention also offers the advantage of being able to cause or promote oxidation reaction product growth in parent metals without the necessity of alloying the dopant material into the parent metal, thereby rendering the process feasible, for example, for application to commercially available metals and alloys which otherwise would not contain or have appropriately doped compositions.

Thus, the aforesaid Commonly Owned Patents and Patent Applications describe the production of oxidation reaction products readily "grown" to desired thicknesses heretofore believed to be difficult, if not impossible, to achieve with conventional ceramic processing techniques. The underlying metal, when raised to a certain temperature region above its melting point, and in the presence of dopants (if required) is transported through its own otherwise impervious oxidation reaction product, thus exposing fresh metal to the oxidizing environment to thereby yield further oxidation reaction product. In forming a ceramic composite body, as described in the aforesaid Commonly Owned Pat. No. 4,851,375, the parent metal is placed adjacent a permeable mass of filler material, and the developing oxidation reaction product infiltrates the mass of filler material in the direction and towards the oxidant and boundary of the mass. The result of this phenomenon is the progressive development of an interconnected ceramic matrix, optionally containing some nonoxidized parent metal constituents distributed throughout the growth structure, and an embedded filler.

In producing the ceramic composite, any suitable oxidant may be employed, whether solid, liquid, or gaseous, or a combination thereof. If a gas or vapor oxidant, i.e. a vapor-phase oxidant, is used the filler is permeable to the vapor-phase oxidant so that upon exposure of the bed of filler to the oxidant, the gas permeates the bed of filler to contact the molten parent metal therein. When a solid or liquid oxidant is used, it is usually dispersed through a portion of the bed of filler adjacent the parent metal or through the entire bed, typically in the form of particulates admixed with the filler or as coatings on the filler particles.

Polycrystalline bodies comprising a metal boride are produced in accordance with Commonly Owned U.S. Pat. No. 4,777,014, which issued on Oct. 11, 1988, from U.S. patent application Ser. No. 837,448, filed Mar. 7, 1986, in the name of Marc S. Newkirk, et al., and entitled "Process for Preparing Self-Supporting Bodies and Products Made Thereby". In accordance with this invention, boron or a reducible metal boride is admixed with a suitable inert filler material, and the molten parent metal infiltrates and reacts with the boron source. This reactive infiltration process produces a boride-containing composite, and the relative amounts of reactants and process conditions may be altered or controlled to yield a polycrystalline body containing varying volume percents of ceramic, metal, reinforcing filler, and/or porosity.

SUMMARY OF THE INVENTION

In accordance with this invention, there is disclosed a plurality of distinct, but combinable, mechanisms for preventing undesirable oxidation (i.e., oxidation protection mechanisms) of reinforcement materials (e.g., fibers) in composite bodies. These oxidation protection mechanisms include the use of getterer materials which are present in at least a portion of the composite body (e.g., in at least a portion of the matrix; or in, on or adjacent to at least a portion of the reinforcing materials, etc.). These getterer materials tend to scavenge (e.g., react with) undesirable oxidants which enter the composite body.

In a preferred embodiment of the invention, the getterer material or materials may form a desirable compound (e.g., a glass or an oxide material) which further enhances the oxidation protection of a composite body. For example, when a composite body is put into service in an oxidizing environment, and assuming that the oxidizing environment would have an adverse effect upon the reinforcing material, some type of oxidation protection mechanism should be utilized to prevent the reinforcement from oxidizing undesirably. If a getterer material was placed on, or at least in close proximity to, the reinforcing material, then an oxidant which came into contact with the getterer material could be gettered (e.g., reacted) by the getterer materials, thereby ameliorating undesirable reaction(s) with the reinforcing material. Further, if the getterer material forms a desirable compound, for example, a glass, the compound could provide even further oxidation protection to the reinforcing material. In this regard, if a formed glass had an appropriate viscosity and a suitably low oxidant (e.g., oxygen) permeability, then the formed glass could flow into any microcracks which may be present near the formed glass, thereby permitting the formed glass to function as a crack sealant. In this regard, the formed glass should have an oxidant permeability which is low enough to provide for suitable oxidation protection at the intended operation temperatures of the composite body for a desirable amount of time.

The composite body can be engineered so that one or more getterer materials are included in the composite body such that one or more desirable compounds (e.g., glasses) are formed. Each of the getterer materials could react with one or more oxidants at different temperatures and form one or more desirable compounds (e.g., one or more desirable glasses) which may provide for differing amounts of oxidation protection at different temperatures. In addition, the formed compounds could further react with other species contained in the composite body to produce additional desirable compounds. Accordingly, a composite body could be produced which contained a plurality of different oxidation protection mechanisms, wherein each oxidation protection mechanism was included to provide for desirable oxidation protection at different service temperatures of the composite body.

One exemplary manner of placing an oxidant getterer material onto a reinforcing material would be to dip, paint or spray an appropriate material onto at least a portion of the reinforcing material prior to matrix formation. Alternatively, chemical vapor deposition (CVD) or chemical vapor infiltration (CVI) techniques could be utilized to obtain one or more coatings on at least a portion of, or in a preferred embodiment, substantially all of, a reinforcing material. It would be desirable for such coatings to be capable of surviving any matrix formation steps in addition to providing in-service oxidation protection.

In a preferred embodiment of the invention, a coated ceramic filler material, adaptable for use as a reinforcing component in a ceramic matrix composite, is provided with a plurality of superimposed coatings. The filler or reinforcing material useful for this embodiment includes materials where the length exceeds the diameter, typically in a ratio of at least about 2:1 and more preferably at least about 3:1, and includes such filler materials as whiskers, fibers, and staple. The coating system includes a first coating in substantially continuous contact with the ceramic filler material, and one or more additional or outer coatings superimposed over the underlying coating, and in substantially continuous contact therewith. Zonal junctions are formed between the filler and first coating, between superimposed coatings, and between the outer coating and the ceramic matrix. The coatings are selected so that the interfacial shear strength of at least one of these several zones is weak relative to the other zones. As used herein and in the appended claims, a zonal junction is not limited to an interface, per se, between the surfaces but also includes regions of the coatings in proximity to the interfaces, and shear, therefore, is zonal in that it may occur at an interface or within a coating. Further, it is understood that the zonal junction between adjacent surfaces may be minimal or negligible and exhibit essentially no bonding or adhesion, or the adjacent surfaces may exhibit appreciable bonding or a strong bond. Upon the application of fracture stress to the composite, the weak zone allows for debonding of the filler before the filler fractures, and pull-out or shear of the filler upon fracture of the filler. This debonding and friction pull-out enhances certain mechanical properties of the composite, and in particular debonding improves the fracture toughness. Thus, in a duplex coating system, for example, having a first coating and a second, outer coating superimposed on the first coating, the coatings are chosen to facilitate debonding and pull-out such that Junction between one of the three interfaces (i.e. the interface between the filler and the inner coating, the interface between the inner coating and the outer coating, the interface between the outer coating and the surrounding matrix, or the strength of a coating) is weak relative to the other zonal junctions and allows for debonding and pull-out.

By reason of this embodiment of the invention, the coated ceramic filler materials not only provide improved mechanical properties, but also the filler is protected from severe oxidizing environments and yet amenable to the processing conditions for making a composite in accordance with the Commonly Owned Patents and Patent Applications. Certain fillers are at least partially reduced by the molten parent metal upon contact with the filler, and the coating protects the filler against this local reducing environment. Thus, the coated fillers are adaptable for use as a reinforcing component in a ceramic matrix composite formed by the directed oxidation reaction of a molten precursor metal or parent metal with an oxidant. Accordingly, a lay-up comprising a parent metal and an adjacent mass of filler can be heated in an oxidizing environment to a temperature above the melting point of the metal but below the melting point of its oxidation reaction product which reacts with the oxidant (e.g. air) to form a polycrystalline oxidation reaction product. The oxidation reaction is continued thereby growing an oxidation reaction product of increasing thickness which progressively infiltrates or grows into the permeable mass of filler material to form the composite product. As explained above, it is desirable to provide the filler material with two or more superimposed coatings so as to prolong the useful life or performance of the components and the composite. The filler material is first provided with an inner coating in substantially continuous contact with the filler material which may serve to protect the filler. An outer coating, in substantially continuous contact with the underlying coating, is preferably selected so as to be wettable by molten parent metal under the conditions of the matrix formation process and substantially nonreactive therewith, and inhibits degradation of the filler material and the first or inner coating by molten metal and/or the oxidant. Further, the interfacial shear strength of one of the zonal junctions is weak relative to the others thereby permitting debonding and pull-out of the filler material on application of stress.

The choice of parent metal and oxidant will determine the composition of the polycrystalline matrix, as explained in the Commonly Owned Patents and Patent Applications. Thus a filler bearing the coating system may have admixed therewith a solid or liquid oxidant, such as boron, silica, or low melting glasses, or the oxidant may be gaseous, such as an oxygen-containing gas (e.g. air) or a nitrogen-containing gas (e.g. forming gas typically comprising, by volume, 96% nitrogen and 4% hydrogen).

In general, coated filler materials of this invention may be utilized in the manufacture of composite materials (e.g., ceramic matrix composites) that provide improved mechanical properties, especially increased fracture toughness. When so employed, the thickness of the coatings is sufficient to protect the ceramic filler material against corrosive environments such as those of molten metals. However, the coatings should not be so thick as to serve as a source of structural defects or to interfere with the function of the filler. Moreover, the coatings can be selected so that one or more of the coatings serves as an oxidant getterer when the composite is put into service. In a further preferred embodiment, once the oxidant getterer has formed a compound (e.g., at least one glassy compound) due to a reaction between the getterer and the oxidant, the formed compound provides further protection due to, for example, flowing into a crack to function as a crack sealant.

Certain of the ceramic matrix composites of the present invention are adaptable to finishing operations such as machining, polishing, grinding, etc. The resultant composites are intended to include, without limitation, industrial, structural, and technical ceramic bodies for applications where improved strength, toughness and wear resistance are important or beneficial.

The following terms, as used herein and in the claims, have the stated meanings as defined below:

The term "oxidation reaction product" in conjunction with both oxidation reaction product growth and gettering means one or more metals in any oxidized state wherein the metal(s) have given up electrons to or shared electrons with another element, compound, or combination thereof. Accordingly, an "oxidation reaction product" under this definition includes the product of the reaction of one or more metals (e.g. aluminum parent metal) with an oxidant such as oxygen or air, nitrogen, a halogen, sulfur, phosphorous, arsenic, carbon, boron, selenium, tellurium; compounds such as silica (as a source of oxygen), and methane, ethane, propane, acetylene, ethylene, and propylene (as a source of carbon); and mixtures such as $H_2/H_2O$ and $CO/CO_2$ which are useful in reducing the oxygen activity of the environment.

The term "oxidant" means one or more suitable electron acceptors or electron sharers and may be a solid, liquid, or gas (vapor) or some combination of these. Thus, oxygen (including air) is a suitable vapor-phase gaseous oxidant for the formation of oxidation reaction product, with air being preferred for reasons of economy. Boron, boron carbide and carbon are examples of solid oxidants for the formation of oxidation reaction product under this definition.

The term "parent metal" as used in the specification and appended claims refers to that metal, e.g. aluminum, which is the precursor of a polycrystalline oxidation reaction product such as alumina, and includes that metal or a relatively pure metal, a commercially available metal having impurities and/or alloying constituents therein, and an alloy in which that metal precursor is the major constituent; and when a specified metal is mentioned as the parent metal, e.g. aluminum, the metal identified should be read with this definition in mind unless indicated otherwise by the context.

The term "ceramic", as used in this specification and the appended claims, is not limited to a ceramic body in the classical sense, that is, in the sense that it consists entirely of non-metallic, inorganic materials, but rather, it refers to a body which is predominantly ceramic with respect to either composition or dominant properties, although the body may contain substantial amounts of one or more metallic constituents such as derived from the parent metal, most typically within a range of from about 1–40% by volume, but may include still more metal.

DETAILED DESCRIPTION OF THE INVENTION

Figure 1:
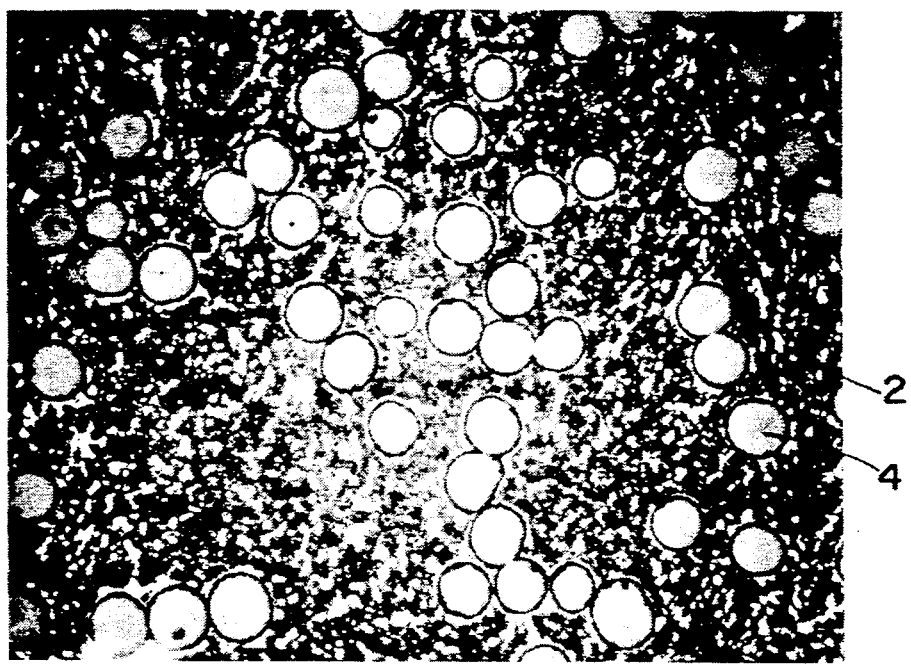
FIG. 1 is a scanning electron micrograph taken at 150× magnification of a coated ceramic filler material in a ceramic matrix and made according to the invention.

In accordance with this invention, there is disclosed a plurality of distinct, but combinable, mechanisms for preventing undesirable oxidation (i.e., oxidation protection mechanisms) of reinforcement materials in composite bodies.

Suitable ceramic filler materials which may be used in the invention include metal oxides, borides, carbides, nitrides, silicides, and mixtures or combinations thereof, and may be relatively pure or contain one or more impurities or additional phases, including composites of these materials. The metal oxides include, for example, alumina, magnesia, ceria, hafnia, lanthanum oxide, neodymium oxide, samaria, praseodymium oxide, thoria, urania, yttria, and zirconia. In addition, a large number of binary, ternary, and higher order metallic compounds such as magnesium-aluminate spinel, silicon aluminum oxynitride, borosilicate glasses, and barium titanate are useful as refractory fillers. Additional ceramic filler materials may include, for example, silicon carbide, silica, boron carbide, titanium carbide, zirconium carbide, boron nitride, silicon nitride, aluminum nitride, titanium nitride, zirconium nitride, zirconium boride, titanium diboride, aluminum dodecaboride, and such materials as Si—C—O—N compounds, including composites of these materials. The ceramic filler may be in any of a number of forms, shapes or sizes depending largely on the matrix material, the geometry of the composite product, and the desired properties sought for the end product, and most typically are in the form of whiskers and fibers. The fibers can be discontinuous (in chopped form as staple) or in the form of a single continuous filament or as continuous multifilament tows. They also can be in the form of two- or three-dimensional woven continuous fiber mats or structures. Further, the ceramic mass may be homogeneous or heterogeneous.

The oxidation protection mechanisms of the invention include the use of getterer materials which are present in at least a portion of the composite body (e.g., in at least a portion of the matrix; or in, on or adjacent to at least a portion of the reinforcing materials, etc.). These getterer materials tend to scavenge (e.g., react with) undesirable oxidants which enter the composite body.

In a preferred embodiment of the invention, the getterer material or materials may form a desirable compound (e.g., a glass or an oxide material) which further enhances the oxidation protection of a composite body. For example, when a composite body is put into service in an oxidizing environment, and assuming that the oxidizing environment would have an adverse effect upon the reinforcing material, some type of oxidation protection mechanism should be utilized to prevent the reinforcement from oxidizing undesirably. If a getterer material was placed on, or at least in close proximity to, the reinforcing material, then an oxidant which came into contact with the getterer material could be gettered (e.g., reacted) by the getterer materials, thereby ameliorating undesirable reaction(s) with the reinforcing material. Further, if the getterer material forms a desirable compound, for example, a glass, the compound could provide even further oxidation protection to the reinforcing material. In this regard, if a formed glass had an appropriate viscosity and a suitably low oxidant (e.g., oxygen) permeability, then the formed glass could flow into any microcracks which may be present near the formed glass, thereby permitting the formed glass to function as a crack sealant. In this regard, the formed glass should have an oxidant permeability which is low enough to provide for suitable oxidation protection at the intended operation temperatures of the composite body for a desirable amount of time.

A number of candidate getterer materials useful in combination with various matrices and reinforcements will become apparent to an artisan of ordinary skill upon review of this disclosure. Specifically, in a preferred embodiment of the invention, many reinforcement materials (e.g., fibers) are susceptible to oxidation by oxidants such as oxygen. Accordingly, it often is vitally important to prevent oxygen from contacting the reinforcing fibers so as to prevent any negative effects upon the fibers. In this regard, oxygen typically is transported to a fiber surface by a combination of different mechanisms. In general, oxygen usually enters the surface of a composite body due to some flaw present on the surface (e.g., machining marks, a broken or cracked outer protective skin, etc.). Once the oxygen has permeated the surface of a composite body, oxygen may then ingress further into the composite body by various channels present in the composite body due to microcracking from processing, thermal shock, physical shock, etc. In addition, molecular oxygen diffusion may also occur in combination with the physical egress of oxygen into the composite body. If an appropriate oxygen getterer material was positioned such that the oxygen which ingressed into the composite could be gettered (e.g., reacted with) by the oxygen getterer, then further ingress of that particular oxygen molecule would be inhibited. However, if additional oxygen ingressed into approximately the same area in the composite, at some point substantially all of the oxygen gettering material will eventually react with the ingressing oxygen. At that point, it would be desirable for another oxidation protection mechanism to occur. In this regard, if the oxygen gettering material was chosen so that one or more desirable compounds (e.g., oxides or glasses) were formed upon a reaction with the oxygen, then such glasses or other oxides could block (e.g., flow into) any cracks, channels, microcracks, etc., to inhibit the physical transport of oxygen further into the composite body.

Examples of two materials which function as suitable oxygen getterers and glass formers are boron nitride, which when reacted with oxygen may form a boron oxide glass and silicon carbide, which when reacted with oxygen may form a silicon oxide glass. Moreover, it is possible that when both boron oxide glass and silicon dioxide glass are present, the glasses may exist independently and/or may form a borosilicate glass. Still further, if additional materials are present in the vicinity of the forming glasses, such as aluminum (e.g., as a metal or an oxidized compound such as $Al_2O_3$) zirconium, in various forms both oxidized and non-oxidized, etc., it is possible to form in addition to those glasses mentioned above, glasses such as zirconium borosilicates, aluminum borosilicates, etc.

Thus, it should be apparent that one or more oxygen getterer materials can be included in a composite body to form a number of desirable compounds, such as those glasses discussed immediately above. In this regard, it is possible to design a composite body so that when a composite body is subjected to use in an oxidizing environment, a first glass, such as a low melting borosilicate glass, will form and protect the reinforcing material of the composite at low temperatures. As the temperature of the composite body is increased, it is possible to form more refractory or higher melting glasses which may result in oxidation protection at even higher service temperatures. For example, a high melting glass such as a zirconium borosilicate may extend the service life of a composite body to heretofore believed to be impossible times at elevated temperature. It also may be necessary to provide oxidation protection at intermediate temperatures. In this regard, it may be desirable to form a glass such as an aluminum borosilicate which would bridge the gap in service temperature between, for example, the lower melting boron oxide glasses and the higher melting glasses such as zirconium borosilicate. As is apparent from the above discussion, the number of combinations of oxygen gettering materials which can form desirable glasses, which may or may not react with other materials in the composite body, is quite large.

Further, an important criteria in selecting materials which function to getter oxygen is the viscosity and oxygen permeability of the glassy material which is formed due to reaction of the oxygen gettering material with oxygen. For example, in a silicon carbide fiber reinforced aluminum oxide material, an oxygen gettering material which could be coated onto the fibers and form a glass may need to have an oxygen permeability of about $1 \times 10^{-9}$ g-$O_2$/cm$^2$ sec in order for the composite body to survive a few hours. However, if it is important for the composite body to survive thousands of hours, the oxygen permeability may need to be even lower, for example, about $1 \times 10^{-12}$ g-$O_2$/cm$^2$ sec may be necessary. It is of course apparent that oxygen permeability is a function of temperature and an artisan of ordinary skill would need to determine the precise service temperature or temperatures that a composite body would be exposed to during service to determine the best combination of oxygen gettering and glass forming materials to be used to extend the useful life of the composite body.

In general, oxygen gettering materials which form borosilicate glasses provide for relatively low temperature oxidation protection (e.g., less than about 600° C.); oxygen gettering materials which form a calcium aluminosilicate glass may provide intermediate temperature oxidation protection (e.g., about 600° C.–1200° C.); oxygen getterers that form silicate glasses may provide intermediate to high temperature oxidation protection (e.g., about 600° C.–1800° C.); oxygen gettering materials which form a zirconium silicate glass or zircon structure may provide high temperature oxidation protection (e.g., about 1200° C.–1800° C.); and oxygen gettering materials which form zirconia and silica glasses may provide for very high temperature oxidation protection (e.g., about 1800° C.–2200° C.).

Accordingly, it is apparent that a composite body can be engineered so that one or more getterer materials are included in the composite body such that one or more desirable compounds (e.g., glasses) are formed. Each of the getterer materials could react with one or more oxidants at different temperatures and form one or more desirable compounds (e.g., one or more desirable glasses) which may provide for differing amounts of oxidation protection at different temperatures. Accordingly, a composite body could be produced which contained a plurality of different oxidation protection mechanisms, wherein each oxidation protection mechanism was included to provide for desirable oxidation protection at different service temperatures of the composite body.

One exemplary manner of placing an oxidant getterer onto a reinforcing material would be to dip, paint or spray an appropriate material onto at least a portion of the reinforcing material prior to matrix formation. Alternatively, chemical vapor deposition (CVD) or chemical vapor infiltration (CVI) techniques could be utilized to obtain one or more coatings on at least a portion of, or in a preferred embodiment, substantially all of, a reinforcing material. It would be desirable for such coatings to be capable of surviving any matrix formation steps as well as providing in-service oxidation protection. It should be understood that the thickness of any coating which may be applied to a reinforcing material influences a number of different properties, including the mechanical properties of a composite body, at both room temperature and elevated temperatures, as well as the amount of oxidation protection afforded the reinforcing material. In general, the thickness of coatings on fibers in ceramic matrix composite bodies, where the ceramic matrix composite bodies are to be subjected to elevated temperature environments, should be from a few tenths of a micron thick to a few tens of microns in thickness. Thicknesses greater than a few tens of microns may result in adverse degradation of mechanical properties, whereas thicknesses less than a few tenths of a micron may not provide for adequate oxidation protection of the underlying fibers.

In regard to forming a ceramic matrix composite body by a directed metal oxidation of a parent metal, it has been discovered that a useful filler material or strengthening component for the ceramic matrix composite body should be provided with two or more coatings. The first or inner coating is applied to the filler as a continuous film or layer, and preferably forms a bond with the filler. The second and any subsequent coatings are superimposed over an underlying coating and become attached or bonded therewith as additional layers or stratum. Each coating is applied as a substantially continuous layer, and each is in substantially continuous contact with the underlying coating or filler in the case of the first coating. The bond formed between adjacent surfaces may be weak or negligible in that there may be little or no adhesion or connection, but in the preferred embodiment there is a measurable or appreciable bonding or union between surfaces.

In a preferred embodiment of the invention, two coatings only are applied to the filler material. In such a system utilizing a duplex coating, the coatings are selected to provide adequate mismatch in bonding strengths so as to allow for debonding and pull-out upon application of stress. Also, the duplex coating is selected to provide protection against degradation of the filler, and the outer coating is selected to exhibit wettability of molten parent metal and to protect the inner coating from degradation or corrosion in high temperature, oxidizing environments under the conditions of the matrix formation process. Also, a system using two coatings rather than three or more, is advantageous from an economic standpoint.

Thus, the coatings are selected so as to be compatible with the filler material, and to the process conditions for the manufacture of the composites. Also, the coatings should complement each other in achieving the desired characteristics or properties. In a ceramic composite system having incorporated therein a filler with a duplex coating, for example, the first and outer coatings are selected to provide an adequate mismatch in interfacial shear strength so that one of the three zonal junctions is weak relative to the remaining zonal junctions to provide relative movement between the inner coating and the filler, or between coatings, or between the outer coating and the adjacent ceramic matrix. In this manner, debonding and pull-out will occur, thereby improving or enhancing the fracture toughness of the ceramic composite body.

Debonding and pull-out is especially beneficial for filler materials having a relatively high length to diameter ratio, such as fibers, typically at least about 2:1 and more particularly at least 3:1. Filler material with a low length to diameter ratio such as particles or spheres, characteristically exhibits crack deflection toughening.

In applying the coatings to the filler material, the thickness of each coating and the cumulative thickness of all coatings can vary over a wide range. This thickness can depend on such factors as the composition of each coating and their interaction, the type and geometry of the filler, and the process conditions and precursor metal used in the manufacture of the composite. Generally, the cumulative thickness for the coatings should be sufficient to completely cover the ceramic filler material and protect it from oxidation degradation, attack from molten metal, and other corrosive environments which may be encountered in employment of the finished composite. In the preferred embodiment, the inner coating is compatible with the filler material so as not to degrade its integrity, and further the inner coating can be selected to allow for debonding and pull-out or shear. The coating system is selected to be compatible with the matrix material, especially the precursor for the matrix, and further the coating system is selected so as to be capable of withstanding the process conditions used in the manufacture of the composites. While the inner coating may afford adequate protection against degradation of the filler or allow for shear between this first coating and the filler, a second or outer coating is selected to be compatible with the process conditions employed in the manufacture of the ceramic composite body, in that it should be substantially inert and not degrade, and further should exhibit wettability to molten parent metal when serving as a precursor to the ceramic matrix. Also, if the first coating or fiber is susceptible to attack and degradation by the process environment during composite manufacture or by attack of oxidants diffusing through the matrix during actual service, the second or outer coating is chosen to protect the inner coating or fiber from exposure to processing conditions and/or end use conditions (e.g., the inner coating may function as an oxygen getterer material alone or in combination with other components of the composite body such as other coatings or other materials in the composite body). Thus, the coating system protects the fibers from degradation, as does one coating superimposed on another, and concomitantly provides for compatiblity for matrix formation and use, and for relative movement to allow for shear. By reason of this coating system, structural degradation of the composite components is mitigated thereby prolonging the useful life and performance of the composite, and the fracture toughness of the composite is improved.

If the surface of the filler is very irregular and exhibits nodules, barbs, fibrils, projections, or protuberances, the filler material can mechanically interlock or bond with the adjacent surface including the adjacent coating or adjacent filler material thereby impeding or preventing debonding and pull-out, which can be deleterious to the properties of the composite. It therefore is desirable to provide a coating system which is sufficiently thick to completely cover the irregularities in the filler.

The thickness and properties of the coatings may vary depending on the deposition process and the filler material. In a duplex coating system, the thickness for each coating, in terms of the radius, typically may range from about 0.05 to about 25 microns, preferably to about 10 microns, but the innermost coating can be monoatomic in order to separate the second coating from the filler particle. The cumulative thickness for a coating system may be to about 25 microns, and more preferably 2–10 microns. Usually a coating system having a thickness within this range can be applied to the filler by conventional or known means and will provide the desired properties described above.

It has been found that a number of coating compositions can be employed in the coating system of this invention. These compositions include the metal oxides, nitrides, borides and carbides, alkaline metal salts, alkaline earth metal salts, carbon, silicon, and the like. The choice of coating compositions will depend on the filler material, the compatibility of coatings to each other, and the process conditions for the manufacture of the ceramic composite. For example, silicon carbide fibers can be used as filler in composites made according to the process described in the Commonly Owned Patent Application. In order to provide for debonding and pull-out, the silicon carbide fibers may be coated with boron nitride which prevents a relatively strong bond between the coated fiber and the surrounding matrix. However, boron nitride may be degraded by the oxidation reaction conditions of the process for making the composite. Further, boron nitride may not be wet by certain metals, such as aluminum, under the conditions of the matrix formation process, and therefore as an outer coating would tend to interfere with the matrix formation. However, an inner coating exhibiting little or no wettability by parent metal under process conditions can be advantageous. For example, the coating system may have pores or flaws, but the contact angle of the molten parent metal with the inner coating may preclude transport of the parent metal through any pores or flaws in the inner coating and there by protect the filler from attack by molten metal. The presence of an additional wettable outer coating on the filler would then avoid impedance to the matrix formation process. Therefore, a suitable outer coating such as silicon carbide is applied to the boron nitride coating to achieve compatibility with the forming process and to protect the boron nitride from degradation, such as by oxidation. Silicon carbide is, for example, wet by doped aluminum and relatively oxidation-resistant in an air environment at 1000° C., where boron nitride is typically not wet by aluminum, and is oxidation-prone, at these temperatures. Further, the bond between the two coatings is weak relative to the other bonds thereby facilitating debonding and pull-out of the fibers during fracture. Other useful coating compositions include, for example, titanium carbide, silicon, calcium silicate, calcium sulfate, and carbon as the inner coating, and silicon, silica, alumina, zirconia, zirconium nitride, titanium nitride, aluminum nitride, and silicon nitride as an outer coating. Other suitable compositions for the first and outer coatings may be selected for use with the ceramic filler material provided these coatings complement each other as in the manner described above.

A typical cross-sectional representation of the coated ceramic filler material is shown in FIG. 1 (discussed below in greater detail). In this typical example, the ceramic filler material comprising silicon carbide bears a first inner coating of boron nitride and an additional outer coating of silicon carbide. One or more additional outer coatings may be provided depending on the need. For example, an additional outer coating of titanium carbide may be applied to the outer coating of silicon carbide.

Moreover, it may be desirable to provide dual or multiple duplex coatings such as boron nitride/silicon carbide/boron nitride/silicon carbide. This multiple coating scheme may result in desirable internal oxidation protection mechanisms. Specifically, as discussed above, the interface between boron nitride and silicon carbide may function as a zonal debond junction, thus increasing the fracture toughness of a material, as well as providing for oxidation protection. As discussed above, the precise composition and combination of coatings depends on a number of factors including the processing or manufacturing environment for the composite body as well as the environment into which the composite body will be placed.

The first and outer coatings, typically, are deposited onto the ceramic filler material by conventional or known means such as chemical vapor deposition, plasma spraying, physical vapor deposition, plating techniques, sputtering or sol-gel processing. Achievement of a substantially uniform coating system according to these prior art techniques is within the level of skill in this art. For example, chemical vapor deposition of a uniform coating of boron nitride on ceramic filler materials can be achieved by using boron trifluoride and ammonia at a temperature of about 1000°–1500° C. and a reduced pressure of 1–100 torr; boron trichloride and ammonia at a temperature of 600°–1200° C. and reduced pressure of 1–100 torr; borazine at a temperature of 300°–650° C. and a reduced pressure of 0.1–1 torr; or diborane and ammonia at a temperature of 600°–1250° C. and a reduced pressure of 0.1–1 torr. A coating of silicon carbide by chemical vapor deposition can be accomplished, for example, by using methyltrichlorosilane at a temperature of 800°–1500° C. and a pressure of 1–760 torr; dimethyldichlorosilane at a temperature of 600°–1300° C. and a reduced pressure of 1–100 torr; and silicon tetrachloride and methane at a temperature of 900°–1400° C. and a reduced pressure of 1–100 torr.

It should be understood that various combinations of ceramic materials with first and outer coatings may be produced depending on the specific properties desired in the coated ceramic material and its ultimate application. A possible combination includes silicon carbide fiber with a first layer of titanium carbide and an additional outer layer of silicon nitride. Another coating system includes silicon carbide fiber with a first coating of boron nitride and additional outer coatings of silicon carbide and alumina.

The coated ceramic materials employed in the ceramic matrix composites of the invention are chosen so that debonding and pull-out may be achieved. Thus, the coated fibers are chosen so that the interfacial shear strength between the ceramic filler material and the first coating is sufficiently different from the interfacial shear strength between the first coating and the additional outer coating or between the outermost coating and the ceramic matrix to permit relative movement between the surfaces and allow for debonding and pull-out.

In the manufacture of ceramic matrix composites according to this embodiment of the invention, the coated materials may be provided in the form of a loose mass or may be laid up into a porous preform of any desired configuration. The parent metal is placed adjacent the preform. The parent metal is then heated in the presence of an oxidant to above its melting point whereby the molten metal oxidizes to form and develop an oxidation reaction product embedding the coated ceramic material. During growth of the oxidation reaction product, the molten parent metal is transported through its own otherwise impervious oxidation reaction product, thus exposing free metal to the oxidizing atmosphere to yield additional reaction product. The result of this process is the progressive growth of an interconnected ceramic oxidation reaction product which optionally may contain nonoxidized parent metal.

A variety of ceramic matrices may be produced by the oxidation reaction of parent metals depending upon the choice of parent metal and oxidant. For example, ceramic matrices may include oxides, nitrides, borides, or carbides of such parent metals as aluminum, titanium, tin, zirconium or hafnium. The ceramic matrix composites of the invention may comprise, by volume, 5 to 85% of the coated ceramic filler materials and 95 to 15% of ceramic matrix. A useful composite comprises an alumina matrix formed by the oxidation reaction of aluminum parent metal in air, or an aluminum nitride matrix by oxidation reaction (i.e., nitridation) of aluminum in nitrogen, and incorporating as a reinforcing filler such materials as alumina, silicon carbide, silicon nitride, etc., bearing the coating system. Another useful composite comprises an aluminum boride matrix formed by the reactive infiltration of a bed comprising a boron source (e.g. boron or a reducible metal boride) and a reinforcing filler bearing the coating system.

The following examples illustrates certain aspects and advantages of various embodiments of the invention.

EXAMPLE 1

Two fiber-reinforced alumina-matrix ceramic composite bodies were fabricated in accordance with the present invention. The fibers employed were Nicalon ® ceramic grade silicon carbide as Si—C—O—N (from Nippon Carbon Co., Ltd., Japan) measuring approximately 2 inches long and approximately 10–20 μm in diameter. Each fiber was coated via chemical vapor deposition with a duplex coating. The duplex coating comprised a 0.2–0.5 μm thick first coating of boron nitride applied directly to the fiber, and a 1.5–2.0 μm thick second (outer) coating of silicon carbide applied to the boron nitride coating.

The duplex coated fibers were gathered into bundles, each containing 500 fibers tied with a single fiber tow. Two, 2 inch square by ⅛ inch thick bars of aluminum alloy designated 380.1 (from Belmont Metals, having a nominally identified composition by weight of 8–8.5% Si, 2–3% Zn, and 0.1% Mg as active dopants, and 3.5% Cu, as well as Fe, Mn, and Ni, but the actual Mg content was sometimes higher as in the range of 0.17–0.18%) were placed into a bed of Wollastonite (a mineral calcium silicate, FP grade, from Nyco, Inc.) contained in a refractory crucible such that a 2 inch square face of each bar was exposed to the atmosphere and substantially flush with the bed, while the remainder of each bar was submerged beneath the surface of the bed. A thin layer of silica sand was dispersed over the exposed surface of each bar to serve as an additional dopant. Three of the above-described bundles of duplex-coated fibers were placed on top of each of the two sand-layered metal surfaces, and these set-ups were covered with Wollastonite.

The crucible with its contents was placed in a furnace which was supplied with oxygen at a flow rate of 500 cc/min. The furnace temperature was raised to 1000° C. at a rate of 200° C./hour, and held at 1000° C. for 54 hours.

The crucible was then removed while the furnace temperature was at 1000° C., and allowed to cool to room temperature. The ceramic composite products were recovered. Examination of the two ceramic composite products showed that an alumina ceramic matrix, resulting from oxidation of aluminum, had infiltrated and embedded the fiber bundles.

Figure 2:
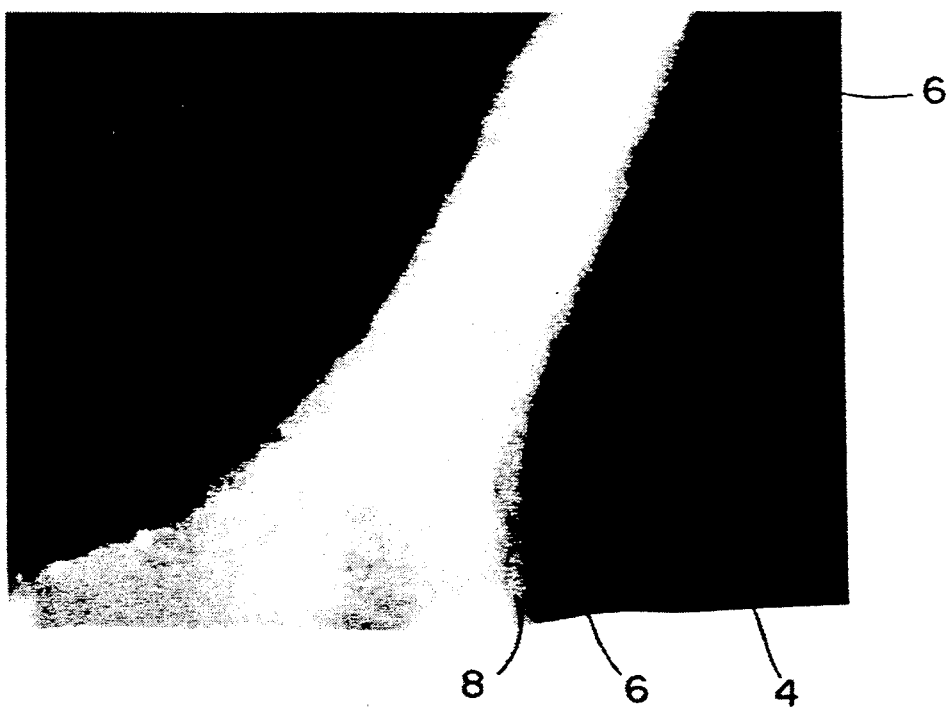
FIG. 2 is a scanning electron micrograph taken at 850× magnification of ceramic matrix composite having a coated Nicalon ® ceramic fiber as filler material and made according to the Example below.
Figure 3:
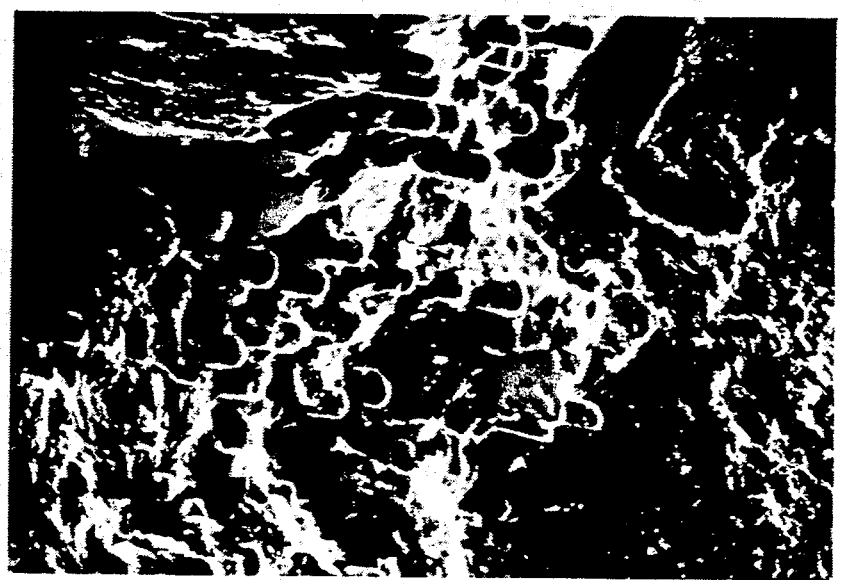
FIG. 3 is a scanning electron micrograph taken at 250× magnification of a fractured surface of the composite made with the coated fibers according to the Example below showing extensive pull-out of the fibers.

Two specimens were machined from each of the two ceramic composite products. FIGS. 1 and 2 are scanning electron micrographs at 150× magnification and 850× magnification, respectively, showing this ceramic matrix composite. Referring to the micrographs, there is shown the alumina matrix 2 incorporating silicon carbide fibers 4 bearing a first inner coating 6 of boron nitride and an outer coating 8 of silicon carbide. One machined specimen from each composite product was tested for flexural strength (Sintech strength testing machine, Model CITS 2000, from Systems Integrated Technology Inc., Stoughton, Mass.) in 4 point bend with a 12.67 mm upper span and a 28.55 mm lower span. The values obtained were 448 and 279 MPa. The remaining specimen from each product was tested for Chevron notch fracture toughness, and the values obtained were 19 and 17 MPam$^{\frac{1}{2}}$, respectively FIG. 3 is a scanning electron micrograph at 250× magnification of the fractured surface of the ceramic composite showing extensive pull-out of the fibers.

Figure 4:
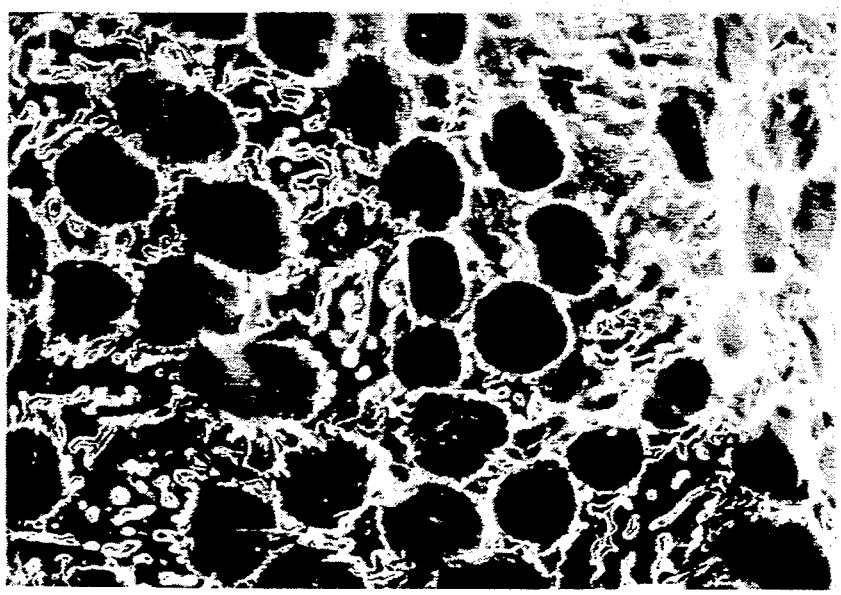
FIG. 4 is a scanning electron micrograph taken at 800× magnification of a fractured surface of the composite made with uncoated fibers according to the Example below showing no pull-out of the fibers.

This run was repeated with the exception that the Nicalon ® fibers were not coated. FIG. 4 is a scanning electron micrograph at 800× magnification of the fractured surface showing essentially no pull-out of the fibers. Typical values for strength ranged from 100–230 MPa, and for toughness ranged from 5–6 MPam$^{\frac{1}{2}}$.

The utility of coated filler material made according to the invention is clearly demonstrated by this Example and the comparative data.

EXAMPLE 2

The following Example demonstrates a method for forming a fiber reinforced ceramic composite body and the resultant mechanical properties of the body from about room temperature to about 1400° C. Specifically, this Example demonstrates a method for forming a silicon carbide fiber reinforced alumina composite body wherein the silicon carbide fibers are coated with a first layer of boron nitride and a second layer of silicon carbide to create a debond zone between the silicon carbide fiber and the alumina matrix.

Figure 5A:
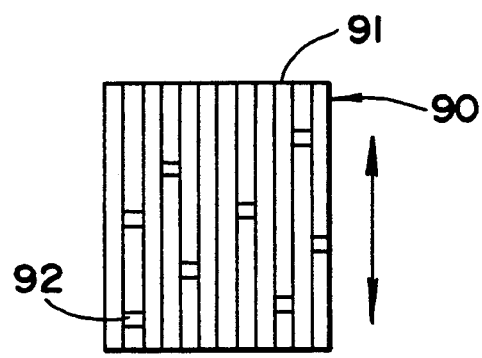
FIG. 5a is a schematic of the top view of harness satin weave fabric in the as-is position as discussed in Example 2.
Figure 5B:
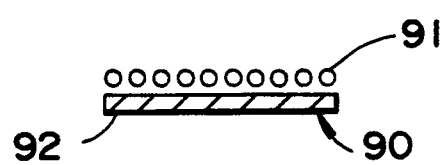
FIG. 5b is a schematic cross-sectional representation of a harness satin weave fabric in the as-is position as discussed in Example 2.
Figure 5C:
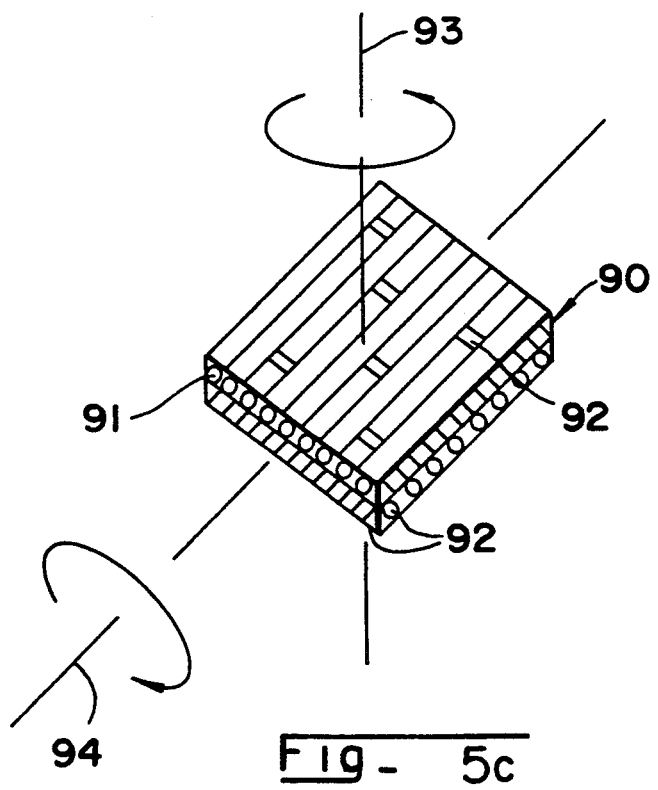
FIG. 5c is an isometric schematic view illustrating the axes of rotation for a ,harness satin weave fabric in the as-is position as discussed in Example 2.
Figure 5D:
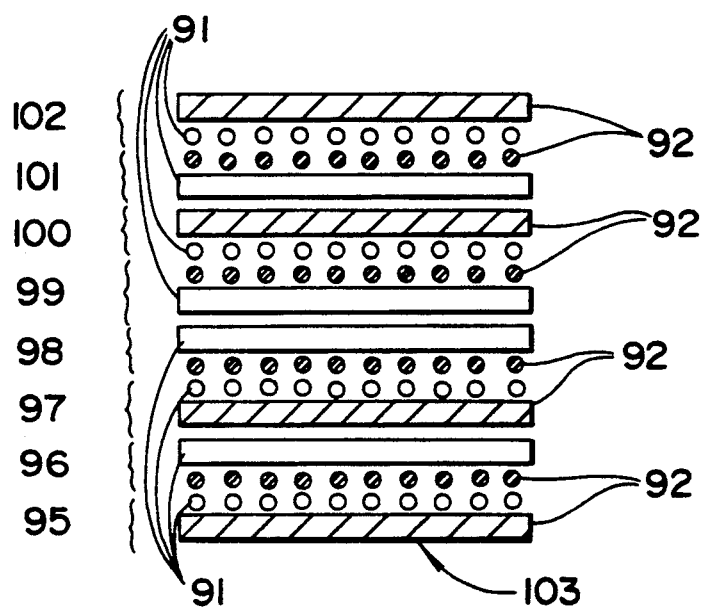
FIG. 5d is a schematic cross-sectional representation of a fabric preform comprised of harness satin fabric as discussed in Example 2.

A fabric preform 103 was made by stacking a plurality of layers of 8 harness satin weave (8 HSW) fabric and 12 harness satin weave (12 HSW) fabric made from NICALON ™ silicon carbide fiber (obtained from Dow Corning Corporation, Midland, Mich.) on top of each other. FIGS. 5a and 5b are schematics depicting a top view and a cross-sectional view respectively of the as-is position for a HSW fabric. In reference to FIG. 5a and 5b, a HSW fabric is designated to be in the "as-is position" when, as viewed in cross-section, the axes of the warp yarns 92 of the fabric 90 are in the plane of the cross-sectional view and are located at the bottom (i.e., as shown in the cross-sectional view) of the fabric 90 and the axes of the fill yarns 91 are perpendicular to the plane of the cross-sectional view and are located at the top of the fabric 90. The orientation of additional fabric layers can be described in reference to the as-is position. For example, as depicted in FIG. 5c, additional fabric layers can be (1) rotated about an axis 93 perpendicular to the plane of the fabric 90 and/or (2) rotated about an axis 94 perpendicular to the plane of the cross-section of the fabric 90 and then subsequently contacted or layered upon a fiber layer positioned in the as-is configuration. Thus, for example, as schematically depicted in cross-section in FIG. 5d, a substantially square fabric preform 103 can be made from 8 pieces of HSW fabric, stacked in the following sequence:

A first fabric layer 95 comprising an 8 HSW fabric was placed on a supporting surface in the as-is position to start the fabric preform 103;

A second fabric layer 96 comprising a 12 HSW fabric, was rotated about 90° in the counterclockwise direction from the as-is position about an axis 93 perpendicular to the plane of the fabric and was placed on the first fabric layer 95 so that the edges of the second fabric layer 96 were substantially aligned with the edges of the first fabric layer A third fabric layer 97 comprising a 12 HSW fabric, in the as-is position, was placed on the second fabric layer 96 so the edges of the third fabric layer 97 were substantially aligned with the edges of the second fabric layer 96;

A fourth fabric layer 98 comprising a 12 HSW fabric, was rotated about 90° in the counterclockwise direction from the as-is position about an axis 93 perpendicular to the plane of the fabric and was placed on the third fabric layer 97 so that the edges of the fourth fabric layer 98 were substantially aligned with the edges of the third fabric layer 97;

A fifth fabric layer 99 comprising a 12 HSW fabric, was rotated about 90° in the counterclockwise direction from the as-is position about an axis 93 perpendicular to the plane of the fabric and then rotated about 180° in the clockwise direction about an axis 94 perpendicular to the plane of the cross-sectional view of the fabric and was placed on the fourth fabric layer 98 so that the edges of the fifth fabric layer 99 substantially aligned with the edges of the fourth fabric layer 98;

A sixth fabric layer 100 comprising a 12 HSW fabric, was rotated about 180° in the clockwise direction from the as-is position about an axis 94 perpendicular to the plane of the cross-sectional view of the fabric and was placed on the fifth fabric layer 99 so that the edges of the sixth fabric layer 100 were substantially aligned with the edges of the fifth fabric layer 99;

A seventh fabric layer 101 comprising a 12 HSW fabric, was rotated about 90° in the counterclockwise direction from the as-is position about an axis 93 perpendicular to the plane of the fabric and then rotated about 180° in the clockwise direction about an axis 94 perpendicular to the plane of the cross-sectional view of the fabric and was placed on the sixth fabric layer 100 so that the edges of the seventh fabric layer 101 were substantially aligned with the edges of the sixth fabric layer 100; and Finally, an eighth fabric layer 102 comprising an 8 HSW fabric, was rotated about 180° in the clockwise direction from the as-is position about an axis perpendicular 94 to the plane of the cross-sectional view of the fabric and was placed on the seventh fabric layer 101 so that the edges of the eighth fabric layer 102 were substantially aligned with the edges of the seventh fabric layer.

Figure 5E:
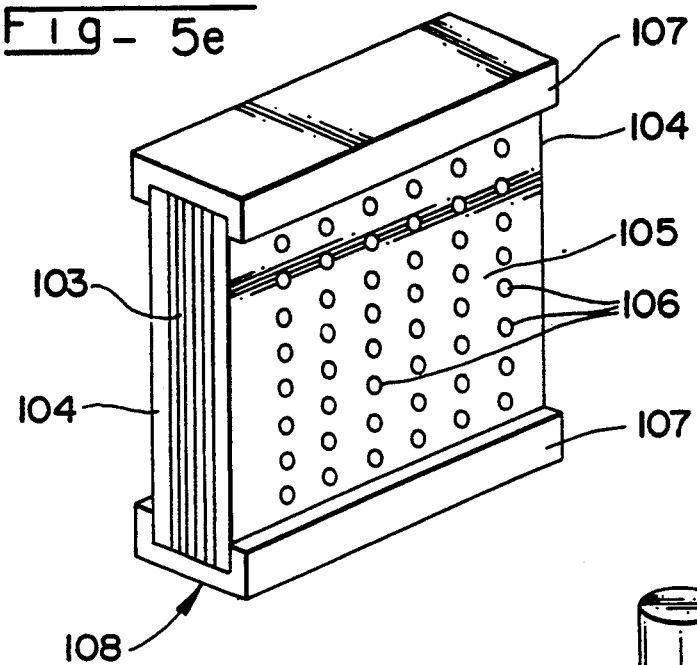
FIG. 5e is an isometric schematic representation of a graphite containment fixture for effecting the coating of a fabric preform as discussed in Example 2.

In reference to FIG. 5e, the fabric preform 103 comprised of the two 8 HSW outer fabric layers and the six 12 HSW inner fabric layers and measuring about 6.75 inch (171 mm) square and about 0.125 inch (3.2 mm) thick was placed on a perforated graphite plate 104 machined from Grade AXF-5Q graphite (Poco Graphite, Inc., Decatur, Tex.) which measured about 7.75 inches (197 mm) square and about 0.5 inch (13 mm) thick. The inner perforated region 105 of the perforated plate measured about 6.25 inches (159 mm) square. The holes 106 of the perforated region 105 had a diameter of about 0.25 inch (6.4 mm) and a center-to-center spacing of about 0.375 inch (9.5 mm) and comprised a 17 hole×17 hole array which was bordered by an about 1 inch (25 mm) unperforated region. After the fabric preform 103 had been placed on the first graphite plate 104, a second graphite plate 104, substantially the same as the first, was placed over the fabric preform 103 and the plates were clamped using C-clamps to compress the fabric preform 103. Two graphite channel members 107 machined from Grade AXF-5Q graphite (Poco Graphite, Inc., Decatur, Tex.) and measuring about 7.75 inches (197 mm) long were placed over common ends of both perforated graphite plates 104 so as to contact opposite ends of the first and second perforated graphite plates 104 thereby creating a preform containment fixture 108. FIG. 5e is an isometric schematic view of the preform containment fixture 108. After the graphite channels 107 were secured to the perforated plates 104, the C-clamps were removed from the perforated plates 104 and the elastic force exerted by the compressed fabric preform 103 biased the perforated graphite plates 104 against the graphite channel members 107 to form a relatively rigid preform containment fixture 108. The warp yarns 92 of the eighth layer 102 of the fabric preform 103 within the graphite containment fixture 108 were positioned so as to be parallel to the length of the graphite channel members 107 of the preform containment fixture 108.

The graphite containment fixture 108 containing the fabric preform 103 was placed into a reactor chamber of a chemical vapor infiltration apparatus having an outer diameter of about 12 inches (305 mm). The inner diameter of the reactor chamber measured about 9.45 inches (240 mm) after being lined with a quartz tube having a wall thickness of about 0.5 inch (13 mm) and lined with a graphite tube having a wall thickness of about 0.25 inch (6.4 mm). The warp yarns 92 of the eighth layer 102 of the fabric preform 103 were parallel to the gas flow direction within the chamber as well as being parallel to the longitudinal axis of the reactor chamber. The reactor chamber was closed and evacuated to about 0.004 inch (0.1 mm) of mercury (Hg). Then the reactor chamber was heated to about 800° C. at about 10° C. per minute so that the contents of the reactor chamber were at about 730° C., as indicated by a thermocouple contained therein. When the temperature within the reactor chamber reached about 730° C., a gas mixture comprised of ammonia (NH$_3$) flowing at about 1200 standard cubic centimeters (sccm) and boron chloride (BCl$_3$) flowing at about 800 sccm was introduced into the reactor chamber while maintaining a total operating pressure of from about 0.047 to about 0.051 inches of mercury (about 1.2 to about 1.3 mm Hg). After about 6.5 hours at about 730° C., the gas mixture flowing into the reactor chamber was interrupted, the power to the furnace heating the reactor chamber was interrupted, and the furnace and its contents were naturally cooled to about 200° C. At about 200° C., the reactor chamber door was opened and the graphite containment fixture 108 was removed, cooled and disassembled to reveal that the fibers of the fabric layers of the fabric preform 103 were coated and that the fabric layers comprising the fabric preform 103 were bonded together by a boron nitride coating formed during the process at about 730° C., thereby forming a coated and bonded fabric preform 109. The boron nitride coating had a thickness of about 0.4 microns.

Figure 5F:
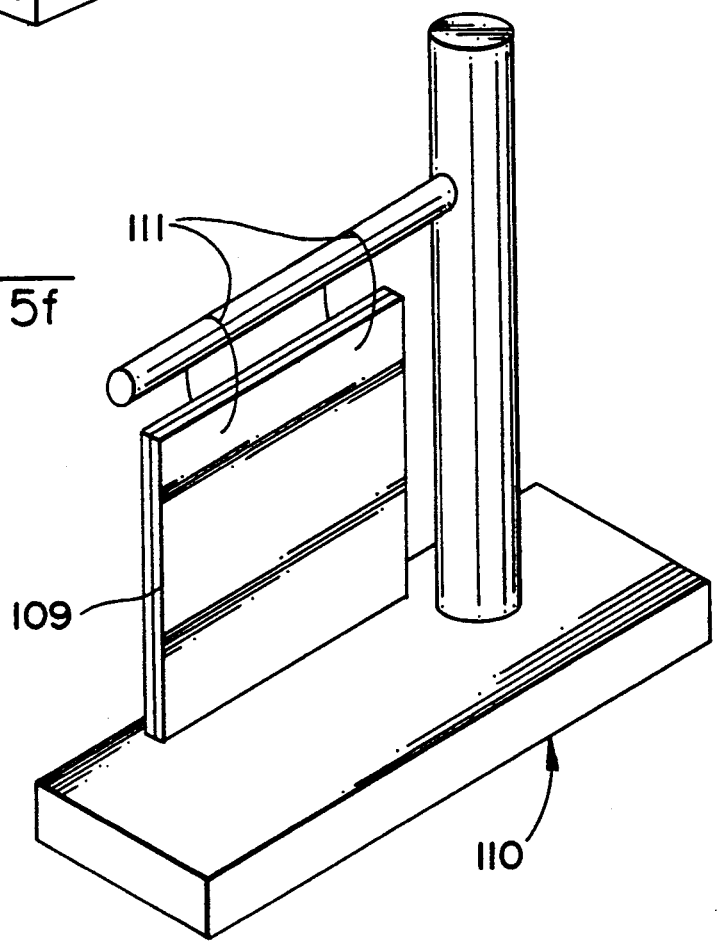
FIG. 5f is a isometric schematic representation of a cantilever graphite fixture for holding a boron nitride coated fabric preform to enable coating of the preform with a second coating as discussed in Example 2.

The boron nitride coated and bonded fabric preform 109 was then suspended from a graphite cantilever support fixture 110 made from Grade AXF-5Q graphite (Poco Graphite, Inc., Decatur, Tex.) by wires 111 comprised of a Kanthale ® iron-chromium-aluminum alloy all of which are depicted schematically in FIG. 5f. The graphite cantilever support fixture 110 and the boron nitride bonded fabric preform 109 were then replaced into the reactor chamber of the chemical vapor infiltration apparatus discussed above such that the warp yarns 92 of the eighth layer 102 comprised of the 8 harness satin weave fabric were parallel to the gas flow direction within the chamber as well as being parallel to the longitudinal axis of the reactor chamber. After the reactor chamber door was closed, the reactor chamber and its contents were evacuated to about 0.591 inches (15 mm Hg) and hydrogen gas flowing at about 2500 sccm was introduced into the reactor chamber. The reactor chamber was heated at about 10° C. per minute so that the contents of the reactor chamber were at about 925° C. as indicated by a thermocouple therein. When the reactor chamber contents were at about 925° C., additional hydrogen, flowing at about 2500 sccm, was introduced into the reactor chamber to give a total hydrogen gas flow rate of about 5000 sccm. Once the temperature of the contents of the reactor chamber had substantially completely stabilized at about 925° C., about 2500 sccm hydrogen were diverted away from direct entry into the reactor chamber, and were first bubbled through a bath of trichloromethylsilane (CH$_3$SiCl$_3$) also known as methyltrichlorolsilane (MTS) (Hulls/Petrarch System, Bristol, Pa.), maintained at about 25° C., before entering the reactor chamber. After about 26 hours at about 925° C., the power to the furnace heating the reactor chamber was interrupted and the about 2500 sccm hydrogen that was being directed through the MTS bath was again permitted to flow directly into the reactor chamber to re-establish a direct hydrogen gas flow rate of about 5000 sccm into the reactor chamber. It was noted that about 4.75 liters of MTS had been consumed during the 26 hour of the run at about 925° C. After about a half hour during which a hydrogen gas flow rate at about 5000 sccm was maintained, the hydrogen flow rate was interrupted and the furnace and its contents were evacuated to about 0.039 inches 0.1 mm of mercury (Hg). The pressure within the reactor chamber was then allowed to increase to about atmospheric pressure while argon was introduced at a flow rate of about 14 liters per minute. After the reaction chamber had cooled to a temperature of about 200° C., the argon flow rate was interrupted and the reaction chamber door was open. The graphite cantilever support fixture 110 and the fabric preform were removed from the reactor chamber to reveal that the boron nitride bonded fabric preform 109 had been coated with a second layer of silicon carbide thereby forming a silicon carbide (SiC)/boron nitride (BN)-coated fabric preform 112. The silicon carbide had a thickness of about 2.3 microns.

A wax box pattern having a closed end and outer dimensions of about 7 inches (178 mm) square by about 2 inches (51 mm) tall and a wall thickness of about 0.25 inches (6.5 mm) was assembled from high temperature wax sheet (Kit Collins Company, Cleveland, Ohio) which contained adhesive backing on one side thereof. The wax box pattern was assembled by using a hot wax knife. The closed end of the wax pattern was beveled at an angle of about 22°. A slurry mixture comprised by weight of about 5 parts BLUONIC® A colloidal alumina (West Bond Corp., Wilmington, Del.) and about 2 parts −325 mesh (average particle diameter less than about 45 μm) wollastonite (a calcium silicate mineral) was made by hand mixing the materials together. The slurry mixture was then painted onto the outer surface of the wax box pattern with a one inch sponge brush and coarse (−10, +100 mesh) wollastonite powder was sprinkled liberally onto the slurry mixture coating to prevent runoff and to form a first precursor layer of a shell 120. This procedure was repeated to build additional layers of coating with an about 0.5 hour drying period between the formation of the precursor layers. When enough precursor layers of slurry mixture/coarse wollastonite were formed to produce a thickness of about 0.25 inch (6.4 mm), the coated wax box pattern was set aside to dry at about room temperature for about 24 hours. The about 0.25 inch (6.4 mm) thick coating nominally comprised about 12 slurry mixture/coarse wollastonite layers. After the coated wax box pattern had substantially completely dried at about room temperature, the wax box pattern was placed into an air atmosphere furnace maintained under an exhaust hood and the furnace and its contents were held at a temperature of about 120° C. for about 6 hours, during which time the wax melted leaving behind an unfired precursor to an alumina bonded wollastonite shell 120. The furnace and its contents were then heated to about 950° C. in about 2 hours and held at about 950° for about 4 hours to substantially completely remove any residual wax and ensure the sintering of the alumina bonded wollastonite shell. The furnace and its contents were then cooled to about room temperature.

Figure 5G:
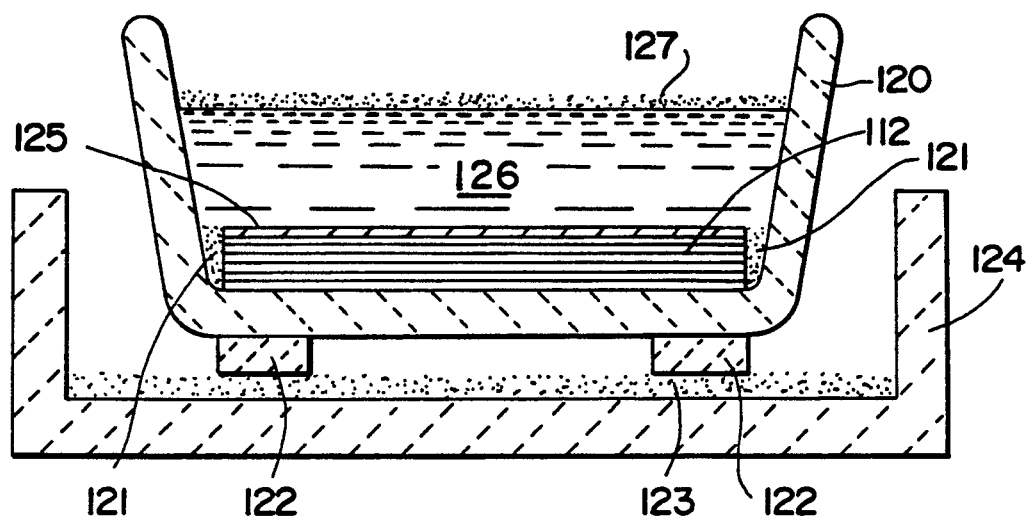
FIG. 5g is a schematic cross-sectional representation of a growth lay-up for forming a fiber reinforced ceramic composite body as discussed in Example 2.

About 40 grams of VASELINE® petroleum jelly vehicle (Cheseborough Ponds, Inc., Greenwich, Conn.) were melted in a small aluminum weighing dish on a hot plate set at about medium heat until the jelly turned to a liquid. A clean sable brush was then used to substantially completely coat one of the 6.75 inch (171 mm) square surfaces of the SiC/BN-coated fabric preform 112 to provide an interface for the application of a nickel oxide powder. A mixture comprising about 8 grams of −325 mesh (particle diameter less than about 45 μm) nickel oxide powder and about 16 grams of ethanol was applied with a sponge brush to substantially completely cover the petroleum jelly coated surface of the SiC/BN-coated fabric preform. After the ethanol had substantially completely evaporated, the SiC/BN-coated fabric preform 112 was inserted into the alumina bonded wollastonite shell 120 such that the uncoated side of the SiC/BN-coated preform 112 not coated with the nickel oxide powder contacted the bottom of the shell 120, as shown in FIG. 5g. The spaces between the perimeter of the SiC/BN-coated fabric preform 112 and the walls of the alumina bonded wollastonite shell 120 were filled with coarse (−10, +100 mesh) wollastonite until the surface of the wollastonite powder was substantially flush with the nickel oxide powder-coated surface of the SiC/BN-coated fabric preform 112. The alumina bonded wollastonite shell 120 containing the SiC/BN-coated fabric preform 112 was then placed onto stilts 122, which were made from fire brick, and was thereafter surrounded by wollastonite powder 123 which was contained in a refractory boat 124. The SiC/BN-coated fabric preform 112 was then leveled. About 1600 grams of a parent metal was distributed into four 30 gram clay crucibles (obtained from J. H. Berge, Inc., South Plainfield, N.J.) in amounts of about 400 grams per crucible. The parent metal comprised by weight of about 8.5 to 11.0 percent silicon, 3.0 to 4.0 percent copper, 2.7 to 3.5 percent zinc, 0.2 to 0.3 percent magnesium, ≦0.01 percent calcium, ≦0.10 percent titanium, 0.7 to 1.0 percent iron, ≦0.5 percent nickel, ≦0.5 percent manganese, ≦0.35 percent tin, ≦0.001 percent beryllium, ≦0.15 percent lead and the balance aluminum. The refractory boat 124 and its contents, as well as the four 30 gram clay crucibles containing the parent metal, were placed into an air atmosphere furnace and the furnace door was closed. The furnace and its contents were then heated from about room temperature to about 700° C. at about 400° C. per hour, during which time the VASELINE® petroleum jelly volatilized and the nickel oxide powder 125 fell onto the surface of the SiC/BN-coated fabric preform 112. After about an hour at about 700° C., during which time the parent metal 126 had substantially completely melted, the parent metal 126 was then poured into the alumina bonded wollastonite shell 120 and onto the nickel oxide powder-coated side of the SiC/BN-coated fabric preform 112, thereby covering the surface of the preform 112. Wollastonite powder 127 was then poured onto the surface of the molten parent metal 126 within the alumina bonded wollastonite shell 120 to substantially completely cover the surface of the molten parent metal. This assembly formed the lay-up for growth of a ceramic matrix composite body. The furnace and its contents comprising the lay-up were then heated to about 950° C. in about an hour. After about 90 hours at about 950° C., the furnace and its contents were cooled to about 700° C. in about 2 hours. At about 700° C., the lay-up was removed from the furnace and residual molten parent metal was decanted from the alumina bonded wollastonite shell 120, the shell 120 was quickly broken away from the SiC/BN-coated fabric preform 112 and the preform 112 was buried in a silica sand bed to cool the preform 112 to about room temperature. At about room temperature, it was observed that an oxidation reaction product had grown into and substantially completely embedded the SiC/BN-coated fabric preform 112, thereby forming a fiber reinforced ceramic composite body 130 having a plurality of fabric layers comprised of harness satin weaves. Specifically, the fiber reinforced ceramic composite body 130 comprised two outer layers of 8 harness satin weave silicon carbide fabric and six inner layers of 12 harness satin weave silicon carbide fabric embedded by an aluminum oxide oxidation product. The composite body also comprised a metallic constituent comprising residual unreacted parent metal.

Once the ceramic composite body had been manufactured, the metal removal process of the present invention was begun. The first step of the metal removal process was to form a filler material mixture for infiltration by metal contained in the formed ceramic matrix composite body.

Specifically, filler material mixture comprising by weight of about 90 percent E67 1000 grit (average particle diameter of about 5 μm) alumina (Norton Co., Worcester, Mass.) and about 10 percent −325 mesh (particle diameter less than about 45 μm) magnesium powder (Reade Manufacturing Company, Lakehurst, N.J.) was prepared in a one gallon NALGENE™ wide mouth plastic container (Nalge Co., Rochester, N.Y.). Alumina milling balls were added to the filler material mixture in the plastic container and the container lid was closed. The plastic container and its contents were placed on a jar mill for about 4 hours to mix the alumina and magnesium powders together. After the alumina mixing balls had been separated from the alumina-magnesium filler material mixture 131, the filler material mixture 131 was complete.

Figure 5H:
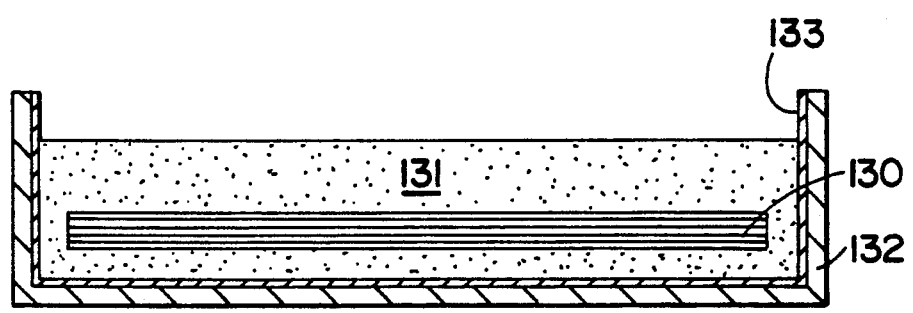

A stainless steel boat 132 measuring about 7 inches (179 mm) square by about 2 inches (50.8 mm) deep and having a wall thickness of about 0.063 inches (1.6 mm) was lined with a graphite foil box 133 made from a piece of GRAFOIL® graphite foil (Union Carbide Corp., Carbon Products Division, Cleveland, Ohio). About 1 inch (25 mm) of the filler material mixture 131 was hand packed into the bottom of the graphite foil lined stainless steel boat 132. The fiber reinforced ceramic composite body 130 was then placed onto and forced into the filler material mixture 131. Additional filler material mixture 131 was then poured over the fiber reinforced ceramic composite body 130 to substantially completely cover it. The filler material mixture 131 was then hand packed to ensure good contact between the filler material mixture 131 and the fiber reinforced ceramic composite body 130, thereby forming a metal removal lay-up as depicted schematically in cross-section in FIG. 5h.

The metal removal lay-up comprising the stainless steel boat 132 and its contents was then placed into a resistance heated controlled atmosphere furnace and the furnace chamber door was closed. The furnace chamber and its contents were first evacuated to at least 30 inches (762 mm) of mercury (Hg) vacuum, then the vacuum pump was disconnected from the furnace chamber and nitrogen was introduced into the chamber to establish about atmospheric pressure of nitrogen in the chamber. This operation was repeated. After the pressure in the furnace chamber reached about atmospheric pressure, the furnace chamber and its contents were heated from about room temperature to about 750° C. at a rate of about 250° C. per hour and held at about 750° C. for about 5 hours and cooled from about 750° C. to about 300° C. at about 200° C. per hour with a nitrogen gas flow rate of about 4000 sccm being maintained throughout the heating and cooling. At about 300° C., the nitrogen flow was interrupted, the furnace door was opened, and the stainless steel boat and its contents were removed and cooled by forced convection. At about room temperature, the filler material 131 was separated from the fiber reinforced ceramic composite body 130 and it was noted that the metallic constituent of the fiber reinforced ceramic composite body 130 had been substantially completely removed. The fiber reinforced ceramic composite body 130 was then subjected to grit blasting by a sand blaster which operated with a working pressure of about 75 pounds per square inch to remove any excess filler material that had adhered to the surface of the composite body 130. The fiber reinforced ceramic composite body was then cut with a diamond saw and machined into mechanical test specimens measuring about 2.4 inches (60 mm) long by about 0.2 inch (6 mm) wide by about 0.11 inch (3 mm) thick for mechanical properties measurements.

Several of the machined mechanical test specimens were then subjected to additional heat treatments. Specifically, a first group of samples was heat treated at about 1200° C. for about 24 hours and a second group of samples was heated treated at about 1200° C. for about 100 hours. The heat treatments were effected by placing the mechanical test specimens onto alumina trays with the tensile side of the test specimen facing away from the alumina trays. The alumina trays and their contents were then placed into air atmosphere furnaces and heated to about 1200° C. at a rate of about 200° C. per hour. After about 24 hours at about 1200° C., the furnace containing the first group of samples was cooled to about room temperature at a rate of about 200° C. per hour, whereas after about 100 hours at about 1200° C., the furnace containing a second group of samples, was cooled to about room temperature at a rate of about 200° C. per hour.

The flexural strengths of the fiber reinforced ceramic composite test specimens were measured using the procedure defined by the Department of the Army's proposed MIL-STD-1942A (Nov. 21, 1983). This test was specifically designed for strength measurements of high-performance ceramic materials. The flexural strength is defined in this standard as the maximum outer fiber stress at the time of failure. A four-point-¼-point flexural test was used. The height and width of the test bars were measured with a precision of about 390 microinch (0.01 mm). The test bars were subjected to a stress which was applied at four points by two lower span bearing points and two upper span bearing points. The lower span bearing points were about 1.6 inches (40 mm) apart, and the upper span bearing points were about 0.79 inch (20 mm) apart. The upper span was centered over the lower span, so that the load was applied substantially symmetrically on the test bar. The flexural strength measurements were made with a Sintec Model CITS-2000/6 universal testing machine (Syntech, Stoughton, Mass.). The crosshead speed during testing was about 0.02 inch per minute (0.55 mm/minute). Flexural strengths determined at about 1200° C., about 1300° C. and about 1400° C. were performed with another universal testing machine equipped with an air atmosphere resistance heated furnace (Advanced Test Systems, Butler, Pa.).

Table I contains a summary of the four point flexural strengths for NICALON ™ silicon carbide reinforced alumina oxidation reaction product composite bodies. Specifically, Table I summarizes the sample condition, the test temperature, the number of samples tested, the average flexural strength and standard deviation, the maximum flexural strength and the minimum flexural strength. These data suggest that the flexural strength of fiber reinforced ceramic composite bodies subjected to the methods of the instant invention are substantially unaffected by test temperature between about room temperature and about 1200° C.

TABLE I

| Sample Condition | Test Temp. | Number of Samples Tested | Average Strength (MPa) | Max. Strength (MPa) | Min. Strength (MPa) |
|---|---|---|---|---|---|
| Metallic constituent removed | Room temp. | 8 | 461 ± 28 | 511 | 438 |
| Metallic constituent removed | 1200° C. | 10 | 488 ± 22 | 517 | 440 |
| Metallic constituent | 1300° C. | 4 | 400 ± 12 | 412 | 386 |

TABLE I-continued

| Sample Condition | Test Temp. | Number of Samples Tested | Average Strength (MPa) | Max. Strength (MPa) | Min. Strength (MPa) |
|---|---|---|---|---|---|
| removed | | | | | |
| Metallic constituent removed | 1400° C. | 4 | 340 ± 11 | 348 | 325 |
| Metallic constituent removed and heat treated at 1200° C. in air for 24 h. | Room temp. | 3 | 288 ± 21 | 302 | 264 |
| Metallic constituent removed and heat treated at 1200° C. in air for 24 h. | 1200° C. | 3 | 397 ± 9 | 404 | 387 |
| Metallic constituent removed and heat treated at 1200° C. in air for 100 h. | Room temp. | 3 | 265 ± 12 | 275 | 253 |
| Metallic constituent removed and heat treated at 1200° C. in air for 100 h. | 1200° C. | 3 | 401 ± 28 | 433 | 379 |

Moreover, these data suggest that the flexural strengths of fiber reinforced ceramic composite bodies subjected to the methods of the instant invention are only slightly degraded at test temperatures greater than 1200° C. and by extended exposure times at 1200° C.

EXAMPLE 3

This Example illustrates that fiber reinforced ceramic composite bodies having varying ceramic matrix composition can be formed. Specifically, Sample A of this Example comprised a silicon carbide fiber reinforced alumina composite body; and Sample B of this Example comprised a silicon carbide fiber reinforced aluminum nitride composite body.

Sample A

A SiC/BN-coated fabric preform measuring about 3.0 inches (76 mm) long by about 3.0 inches (76 mm) wide by about 0.125 inch (3.2 mm) thick was prepared by stacking eight layers of 12-harness satin weave (12 HSW) fabric comprising silicon carbide fibers (NICALON TM fibers obtained from Dow Corning Corporation, Midland, Mich.) the fibers having a diameter ranging from about 394 microinch (10 μm) to about 787 microinch (20 μm). The 12 HSW silicon carbide fabrics were stacked such that each succeeding fabric layer was placed with its fill yarns being rotated about 90° with respect to the fill yarns of the previous fabric layer. The fabric preform comprising the stacked layers were then placed into a chemical-vapor-infiltration (CVI) reactor and the fibers were coated with a first layer of boron nitride (BN) substantially in accordance with the methods of Example 2. Thereafter, the reaction conditions in the CVI reactor were modified such that a CVI coating of silicon carbide (SIC) was placed on top of the BN coating substantially in accordance with the method of Example 2. The CVI coatings held the stacked fabric layers together, thereby forming the SiC/BN-coated o fabric preform.

The SiC/BN-coated fabric preform comprising the eight stacked layers of 12 HSW fabric coated with a first layer of BN and a second layer of SiC was placed into the bottom of a porous castable refractory boat having holes at the bottom to facilitate air flow to the composite during composite growth, thereby forming a lay-up. Specifically, the porous castable refractory boat having an inner cavity measuring about 3.25 inches (83 mm) long by about 3.25 inches (83 mm) long by about 3.0 inches (76 mm) deep and having a wall thickness of about 0.125 inch (3.2 mm) was cast from a mixture comprised by weight of about 56.3% plaster of Paris (BONDEX TM, Bondex International), about 28.1% water and about 15.6% 90 grit alumina (E1 ALUNDUM ®, Norton Company, Worcester, Mass.). After the SiC/BN-coated fabric preform was placed into the porous castable refractory boat, −325 mesh (particle diameter less than about 45 μm) wollastonite particulate (a calcium silicate obtained from Peltz-Rowley Chemical Co., Philadelphia, Pa.) was placed into the void space between the SiC/BN-coated fabric preform and the porous castable refractory boat until the level of the wollastonite was substantially flush with the top surface of the preform. A thin layer of molten petroleum jelly (VASELINE ®, Cheesebrough-Ponds, Inc., Greenwich, Conn.) was first applied to the top surface of the SiC/BN-coated fabric preform and then covered with nickel oxide (NiO) powder substantially in accordance of the methods of Example 2.

The porous castable refractory boat, having stilts at its corners, was placed into a resistance heated air atmosphere furnace and heated to about 700° C. at a rate of about 400° C. per hour. A parent metal, comprising by weight about 7.5–9.5% Si, 3.0–4.0% Cu, ≦2.9% Zn, 0.2–0.3% Mg, ≦1.5% Fe, ≦0.5% Mn, ≦0.35% Sn, and the balance aluminum and weighing about 420 grams, was also placed in a refractory container in the resistance heated air atmosphere furnace and heated to about 700° C. When parent metal was molten, the furnace door was opened and the parent metal was poured into the heated porous castable refractory boat and onto the NiO powder coated preform, thereby covering the surface of the SiC/BN-coated fabric preform. Wollastonite powder was then placed onto the surface of the molten parent metal within the porous boat to substantially completely cover the surface of the molten parent metal, thereby forming a lay-up. Then the furnace and its contents comprising the lay-up were heated to about 1000° C. in about an hour. After about 60 hours at about 1000° C., the furnace and its contents were cooled to about 700° C. in about 2 hours. At about 700° C., the lay-up was removed from the furnace and residual molten parent metal was decanted from the porous castable refractory boat. The refractory boat was rapidly broken away from the formed composite, and the formed composite was buried in silica sand to permit the composite to cool to about room temperature. At about room temperature, the composite was removed from the silica sand and it was observed that an oxidation reaction product comprising alumina had grown into and substantially completely embedded the SiC/BN-coated fabric preform, thereby forming the ceramic matrix composite body having a plurality of fabric layers of 12 HSW NICALON ™ fibers silicon carbide as a reinforcement. The ceramic matrix also comprised some residual unreacted parent metal. The silicon carbide fiber reinforced alumina composite body was then cut into bars measuring about 2.4 inches (60 mm) long by about 0.2 inch (6 mm) wide by about 0.11 inch (3 mm) thick in preparation for the removal of at least a portion of the metallic constituent of the formed fiber reinforced ceramic composite body.

Sample B

A graphite foil box having an inner cavity measuring about 4.0 inches (102 mm) long by about 4.0 inches (102 mm) wide by about 3.0 inches (96 mm) deep was made from a piece of graphite foil (GRAFOIL®, Union Carbide, Carbon Products Division, Cleveland, Ohio) measuring about 10.0 inches (254 mm) long by about 10.0 inches (254 mm) wide by about 0.015 inch (0.38 mm) thick. Four parallel cuts, 3.0 inches (76 mm) from the side and about 3.0 inches (76 mm) long were made into the graphite foil. The cut graphite foil was then folded and stapled to form the graphite foil box.

A parent metal, comprising by weight about 3 percent strontium and the balance aluminum and measuring about 4.0 inches (102 mm) long by about 4.0 inches (102 mm) wide by about 1.0 inch (25 mm) thick was coated on one side thereof measuring about 4.0 inches (102 mm) long by about 4.0 inches (102 mm) wide with a slurry comprising by weight about 90% −325 mesh (particle size less than about 45 lm) aluminum alloy powder and the balance ethanol. The −325 mesh aluminum alloy powder was nominally comprised by weight of about 7.5–9.5% Si, 3.0–4.0% Cu, $\leq$2.9% Zn, 0.2–0.3% Mg, $\leq$1.5% Fe, $\leq$0.5% Mn, $\leq$0.35% Sn, and the balance aluminum. The aluminum alloy powder-coated parent metal was then placed into the graphite foil box such that the uncoated surfaces of the parent metal contacted the inner surfaces of the graphite foil box.

A fabric preform measuring about 4.0 inches (102 mm) long by about 4.0 inches (102 mm) wide by about 0.06 inch (1.6 mm) thick was made within the graphite foil box and on the aluminum alloy powder coated surface of the parent metal by stacking four layers of 12 harness satin weave (HSW) silicon carbide fabric (NICALON ™ obtained from Dow Corning Corporation, Midland, Mich.) onto the parent metal. About 0.5 inch (13 mm) of a 500 grit (average particle diameter of about 17 $\mu$m) alumina powder (El ALUNDUM®, Norton Company, Worcester, Mass.) was poured over the 12 HSW fabric preform and leveled. The sides of the graphite foil box that extended beyond the level of the alumina powder covering the 12 HSW fabrics were folded over onto the alumina powder to form a lid for the graphite foil box.

A lay-up was formed in a graphite refractory container by placing and leveling about 0.5 inch (13 mm) of a 500 grit (average particle diameter of about 17 $\mu$m) alumina powder into the bottom of the graphite refractory container. The graphite foil box and its contents comprising the aluminum alloy powder-coated parent metal and the 12 HSW silicon carbide fabric preform were placed into the graphite refractory container and onto a 500 grit (average particle diameter of about 17 $\mu$m) alumina. Additional 500 grit alumina was placed into the graphite refractory container into the void defined by the inner surface of the graphite refractory container and the outer surface of the graphite foil box. The 500 grit (average particle diameter of about 17 $\mu$m) alumina powder also covered the top lid of the graphite foil box and its contents.

The lay-up comprising the graphite refractory container and its contents was placed into a retort lined resistance heat furnace and the retort door was closed. The furnace and its contents were heated to about 100° C. at a rate of about 300° C. per hour. At about 100° C., the retort was evacuated to about 30.0 inches (762 mm) mercury (Hg) vacuum and maintained at about 30.0 inches (762 mm) Hg vacuum to about 150° C. At about 150° C., nitrogen was introduced into the retorted at a flow rate of about 4 liters per minute. The furnace and its contents were then heated to about 900° C. at about 300° C. per hour. After about 200 hours at about 900° C., the furnace and its contents were cooled to about room temperature at a rate of about 300° C. per hour. At about room temperature, the retort door was opened and the lay-up was removed. The lay-up was disassembled, the preform was removed from within the graphite foil box, and it was observed that an oxidation reaction product comprising aluminum nitride had grown into and substantially completely embedded the silicon carbide fabric preform thereby forming a ceramic matrix composite body reinforced with a plurality of fabric layers of 12 HSW NICALON ™ silicon carbide as reinforcement. The ceramic matrix also comprised a metallic constituent comprising residual unreacted parent metal.

Table II contains a summary of the parameters used to practice the metal removal step of the instant invention on Samples A and B. Specifically, Table II contains the dimensions of the sample, the filler material used for metal removal, the infiltration enhancer precursor, the processing temperature, the processing time at the processing temperature, and the processing atmosphere.

Figure 6:
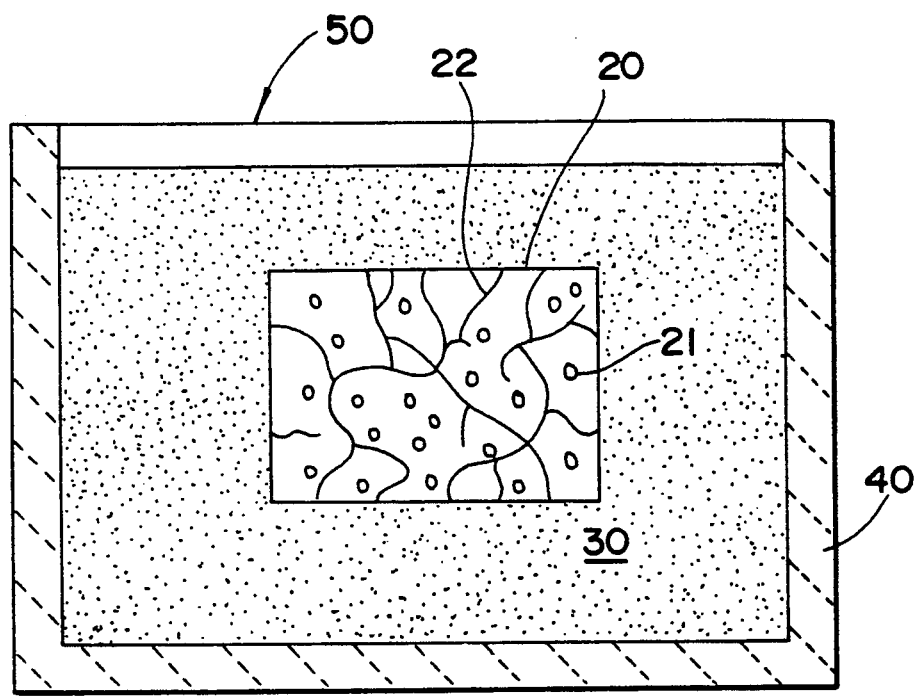
FIG. 6 is a schematic cross-sectional representation of a typical lay-up for removing at least one metallic component of a metallic constituent from substantially all surfaces of a composite body.

FIG. 6 shows a cross-sectional schematic of the setup used in this series of tests to remove the metallic constituent from Samples A and B.

After the formation of the silicon carbide fiber reinforced alumina composite body of Sample A had been achieved, the metal removal process was effected. Specifically, a filler material mixture was formed, comprising by weight about 90 percent filler, which comprised 1000 grit (average particle diameter of about5 $\mu$m) $Al_2O_3$ (E67 tabular alumina, Norton Co., Worcester, Mass.) and about 10 percent by weight −325 mesh (particle diameter less than about 45 $\mu$m) magnesium powder (AESAR®, Johnson Matthey, Seabrook, N.H.). The filler material mixture was mixed in a plastic jar on a rotating jar mill for about an hour.

A graphite foil box having an inner cavity measuring about 3 inches (76 mm) long by about 3 inches (76 mm) wide and about 2.5 inches (64 mm) deep was made from graphite foil (PERMA FOIL, TT America, Portland, Ore.). The graphite foil box was made from a piece of graphite foil, measuring about 8 inches (203 mm) long by about 8 inches (203 mm) wide by about 0.15 inches (4 mm) thick.

TABLE II

| Sample ID | Composite | Geometry | Filler Material For Metal Removal | Infiltration Enhancer Precursor | Processing Temperature | Time At Processing Temperature | Atm. |
|---|---|---|---|---|---|---|---|
| A | SiC$_f$/Al$_2$O$_3$[7] | bar | 1000 grit Al$_2$O$_3$[2] | 10% −325 mesh Mg[3] | 850° C. | 10 h | N$_2$ |
| B | SiC$_f$/AlN[7] | irregular | 1000 grit Al$_2$O$_3$[2] | 10% −325 mesh Mg[3] | 750° C. | 10 h | N$_2$ |

2 E-67 alumina, Norton Co., Worcester, MA.
3 AESAR ®, Johnson Matthey Corporation, Seabrook, New Hampshire
7 SiC fiber reinforced composite.

Four parallel cuts about 2.5 inches (64 mm) from the side and about 2.5 inches (64 mm) long, were made into the graphite foil. The graphite foil was then folded into a graphite foil box and stapled together. Metal was removed from Sample A by first pouring about 0.5 inch (13 mm) of the mixture of filler material and magnesium powder into one of the graphite foil boxes. The filler material mixture was levelled and hand tapped until smooth. A bar of the silicon carbide fiber reinforced alumina composite of Sample A, and measuring about 1.7 inches (43.8 mm) long by about 0.25 inch (6.3 mm) wide by about 0.2 inch (4.5 mm) thick was placed onto the filler material mixture within the graphite foil box and covered with another about 0.5 inch (13 mm) of the filler material mixture which was again levelled and hand tapped until smooth.

The graphite foil box containing Sample A was then placed into a graphite refractory container having inner dimensions of about 9 inches (229 mm) long by about 9 inches (229 mm) wide by about 5 inches (127 mm) deep and having a wall thickness of about 0.5 inch (13 mm). The graphite refractory container and its contents were then placed into a controlled atmosphere resistance heated furnace, the furnace door was closed and the furnace was evacuated to about 30 inches (762 mm) Hg. After about 15 hours at about 30 inches (762 mm) of mercury vacuum, the vacuum was shut off and nitrogen gas was introduced into the furnace chamber at a flow rate of about 1 liter/minute. The operating pressure of the chamber was about 16.7 pounds per square inch (1.2 kg/cm$^2$) with a nitrogen flow rate of about 1 liter/minute. The furnace was heated to about 850° C. at about 200° C. per hour. After about 10 hours at about 850° C., the power to the furnace was interrupted and the graphite refractory container and its contents were allowed to cool within the furnace to about room temperature. Once at room temperature, the graphite refractory container and its contents were removed and the lay-up for Sample A was disassembled to reveal that the metallic constituent comprising an aluminum alloy in the silicon carbide fiber reinforced alumina composite had been drawn out from the composite body during the metal removal process.

The setup for the removal of the metallic constituent from Sample B was substantially the same as that described for Sample A of this Example and is schematically illustrated in FIG. 6. The nitrogen flow rate to effect removal of the metallic constituent from Sample B was about two liters per minute. The controlled atmosphere furnace was heated to about the processing temperature of about 750° C. at a rate of about 200° C. per hour, held at about the processing temperature for about 10 hours. After about 10 hours at the processing temperature, at least a portion of the metallic constituent was removed from within the ceramic matrix composite body. Specifically, the metallic constituent spontaneously infiltrated the filler material mixture comprising substantially a 1000 grit (average particle diameter of about 5 μm) alumina and a −325 mesh magnesium infiltration enhancer precursor. The furnace and its contents were cooled to about room temperature. At about room temperature, the setup was removed from the furnace, disassembled, and weight loss due to the removal of the metallic constituent from Sample B was noted.

EXAMPLE 4

The following Example demonstrates that fiber reinforced ceramic composite bodies formed by the method of the present invention maintain substantially their room temperature fracture toughness at elevated temperatures. A series of fiber preforms were made substantially in accordance with the methods described in Example 2, except that the first layer and eighth layer of the fabric preform comprised 12 harness satin weave (12 HSW) fabric instead of 8 harness satin weave (8 HSW) fabric and the temperature of the methyltrichlorosilane (MTS) bath used during the formation of silicon carbide coatings was maintained at about 18° C. instead of about 25° C. The lay-up for the growth of the fiber reinforced ceramic composite body included an alumina-bonded wollastonite shell fabricated substantially in accordance with the methods described in Example 2, and the composite growth process was substantially the same as that described in Example 2. The resultant ceramic matrix composite bodies were subjected to a metal removal treatment substantially the same as that described in Example 2. The samples were subsequently machined to form mechanical test samples which were used to determine both the flexural strength and the fracture toughness of the fiber reinforced ceramic composite bodies both as a function of test temperature.

Table III summarizes the results of these tests. The methods for measurement of the flexural strength was substantially in accordance with the methods described in Example 2. The method of Munz, Shannon and Bubsey (International Journal of Fracture, Vol. 16 (1980) R137–R141) was used to determine the fracture toughness of the silicon carbide fiber reinforced ceramic composite bodies. The fracture toughness was calculated from the maximum load of Chevron notch specimens in four point loading. Specifically, the geometry of each Chevron notch specimen was about 1.8 to 2.2 inches (45 to 55 mm) long, about 0.12 inch (3 mm) wide and about 0.15 inch (3.75 mm) high. A Chevron notch was cut in each specimen with a diamond saw to permit the propagation of a crack starting at the notch and traveling through the sample. The Chevron notched specimens, having the apex of the Chevron notch pointing downward, were placed into a fixture within a Universal test machine. The notch of the Chevron notch specimen, was placed between two pins about 1.6 inches (40 mm) apart and about 0.79 inch (20 m) from each pin. The top side of the Chevron notch specimen was contacted by two pins about 0.79 inch (20 m) apart and about 0.39 inch (10 mm) from the notch. The maximum load measurements were made with a Syntec Model CITS-2000/6 universal testing machine (System Integration Technology Incorporated, Stoughton, Mass.). A cross-head speed of 0.02 inches/minute (0.58 millimeters/minute) was used. The load cell of the universal testing machine was interfaced to a computer data acquisition system. The Chevron notch sample geometry and maximum load were used to calculate the fracture toughness of the material. Several samples were used to determine an average fracture toughness for a given group of parameters (e.g., temperature, fiber reinforced ceramic composite body, etc.)

Table III summarizes the results of the measurements of the average flexural strength, the maximum flexural strength and the average fracture toughness all as a function of temperature, for Samples D, E and F, which were subjected to the metal removal process. Moreover, the fracture toughness of an "as-grown" Sample C (e.g., without any residual metallic constituent removed) is compared to a treated Sample D (i.e., metallic constituent removed).

TABLE III

| Sample ID | Sample Condition | Test Temp. | Average Flexural Strength (MPa) | Maximum Flexural Strength (MPa) | Average Fracture Toughness (MPa-m$^{\frac{1}{2}}$) |
|---|---|---|---|---|---|
| C | As Grown | RT | — | — | 19 ± 1 |
| D | Metallic constituent removed | RT | 450 (31)* | 563 | 21 ± 1 |
| E | Metallic constituent removed | 1000° C. | 400 (7)* | 432 | 23 ± 1 |
| F | Metallic constituent removed | 1200° C. | 350 (14)* | 406 | 18 ± 1 |

*The number in parentheses indicates the number of sample test.

The data in Table III shows that the fracture toughness of a fiber reinforced ceramic composite body with its metallic constituent substantially completely removed is not significantly diminished at elevated temperatures. In addition, the fracture toughness of a sample which is subjected to the metal removal process does not appear to vary significantly from the fracture toughness of an untreated composite body.

EXAMPLE 5

The following Example demonstrates that fiber reinforced ceramic composite bodies exhibiting excellent fracture toughness can be produced by (1) coating a fabric preform with coatings comprising silicon carbide (SiC)/boron nitride (BN); (2) growing an oxidation reaction product by a reaction of a parent metal with an oxidant which embeds the SiC/BN-coated fabric preform and (3) removing at least some of the metallic constituent from the grown fiber reinforced ceramic composite body.

A NICALON ™ silicon carbide fiber reinforced alumina composite body plate measuring substantially the same as that in Example 2 was formed substantially in accordance with the method of Example 2. Specifically, the fabric preform lay-up, the formation of both the boron nitride and silicon carbide coatings, the growth of the alumina oxidation reaction product embedding the SiC/BN-coated fabric preform and the removal of the metallic constituent from the fiber reinforced ceramic body were performed substantially in accordance with the method of Example 2.

The fracture toughness of the fiber reinforced ceramic composite body was measured substantially in accordance with the method of Example 4, except that specimen size used to determine the toughness measured from about 1.0 to about 1.2 inches (25 to 30 mm) long, about 0.15 inch (3.75 mm) high and about 0.12 inch (3 mm) wide. The apex of the Chevron notch pointed up within the universal test machine. The notch of the specimen was placed between two pins about 0.39 inch (10 mm) apart and about 0.2 inch (5 mm) from each pin. The top side of the specimen was contacted by two pins about 0.79 inch (20 m) apart and about 0.39 inch (10 mm) from the notch. Three specimens were tested to determine an average fracture toughness for a specific test temperature.

The fracture toughness of the fiber reinforced ceramic composite body of this Example was measured at about room temperature, at about 1200° C. and at about 1300° C. These values were about 35.3±1 MPa-m$^{\frac{1}{2}}$, 19.6±1 MPa-m$^{\frac{1}{2}}$ and 18.7±1 MPa-m$^{\frac{1}{2}}$, respectively.

EXAMPLE 6

The following Example demonstrates the intrinsic strength of the ceramic matrix of a fiber reinforced ceramic composite body.

A NICALON ™ silicon carbide fiber reinforced alumina composite was formed substantially in accordance with the methods of Example 2.

The intrinsic strength of the matrix was measured at about room temperature with the short beam method according to ASTM method D 2344-84 entitled "Standard Test Method for Apparent Interlaminar Shear Strength of Parallel Fiber Composite By Short-Beam Method."

The mechanical test specimens were machined to overall dimensions of about 1 inch (25 mm) in length by about 0.16 inch (4 mm) in width by about 0.16 inch (4 mm) in thickness. Furthermore, the orientation of the mechanical test specimens were such that all the fibers were perpendicular to the thickness dimension, i.e., none of the fibers traversed the thickness dimension.

This test was specifically designed to measure the strength, and in particular, the shear strength, of the matrix material between two adjacent layers of the eight total layers of HSW fabric.

A three-point flexural test was used. The thickness and width of the test bars was measured with a precision of about 390 microinch (0.01 mm). The test bars were subjected to a stress which was applied at three points by two lower span bearing points and one upper span bearing point. The lower span bearing points were about 0.67 inch (17 mm) apart and the upper load point was centered over the lower span so that the load was applied substantially symmetrically on the test bar. The flexural strength measurements were made with a Syntec Model No. CITS-2000/6 universal testing machine (System Integration Technology, Inc., Stoughton, Mass.) having a 500 pound (2225 N) full-scale deflection load cell. A computer data acquisition system was connected to the measuring unit and strain gauges in the load cell recorded the test responses. The cross-head speed during testing was about 0.05 inch per minute (1.3 mm per minute).

The interlaminar shear strength was found to be about 62 MPa.

EXAMPLE 7

This Example characterizes the tensile strength of a fiber reinforced ceramic composite body and shows the gradual and progressive failure of such a body as opposed to the sudden and catastrophic failure typical of most ceramic or ceramic composite bodies.

Figure 7:
FIG. 7 is an orthoscopic view of tensile and stress rupture test specimens.

The tensile strength of the fiber reinforced ceramic composite body was measured using the procedures described in ASTM designations A 370 and E 8M-88. FIG. 7 shows the approximate shape of the test specimen which was machine using diamond grinding with the longitudinal axis of the test specimen parallel to either the length or width dimension of the fiber preform. The tensile test specimen measured overall about 6 inches (152 mm) long by about 0.5 inch (13 mm) wide by about 0.12 inch (3 mm) thick. The gage section measured about 0.75 inch (19 mm) long by about 0.35 inch (9 mm) wide. The test was performed using an MTS Model 810 universal testing machine (MTS Systems Corp., Eden Prarie, Minn.) operated at a crosshead speed of about 0.25 mm per minute. The sample strain was monitored with an MTS Model 632-11B-20 clip-on extensometer (MTS Systems Corp.).

Figure 8:
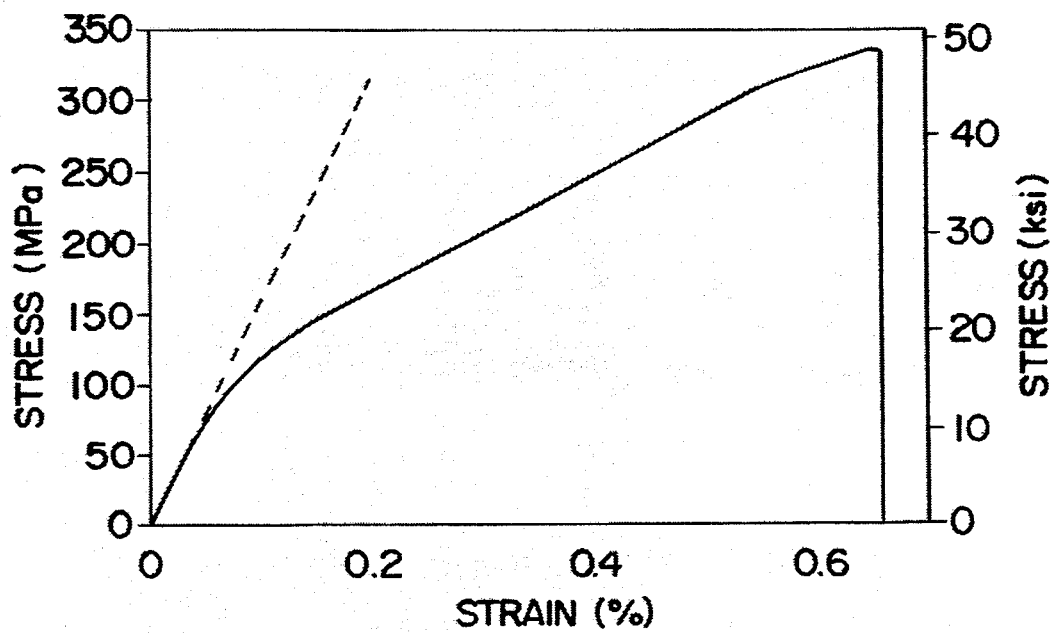
FIG. 8 is a typical stress-strain curve for a fiber-reinforced ceramic composite tensile test specimen.

At room temperature, the average tensile strength for 14 samples was about 331 MPa with a standard deviation of about 22 MPa. The Young's Modulus, as measured by the ratio of stress to strain in the linear portion of the stress-strain curve, averaged about 162 GPa and the average strain-to-failure was about 0.645 percent. FIG. 8 shows a typical stress-strain curve for a fiber reinforced ceramic composite body made substantially by the method of Example 2. The stress-strain curve begins to deviate from linearity at a stress of about 50–60 MPa, which deviation indicates the onset of matrix microcracking and pull-out of the reinforcing fibers from the surrounding matrix material.

Figure 9:
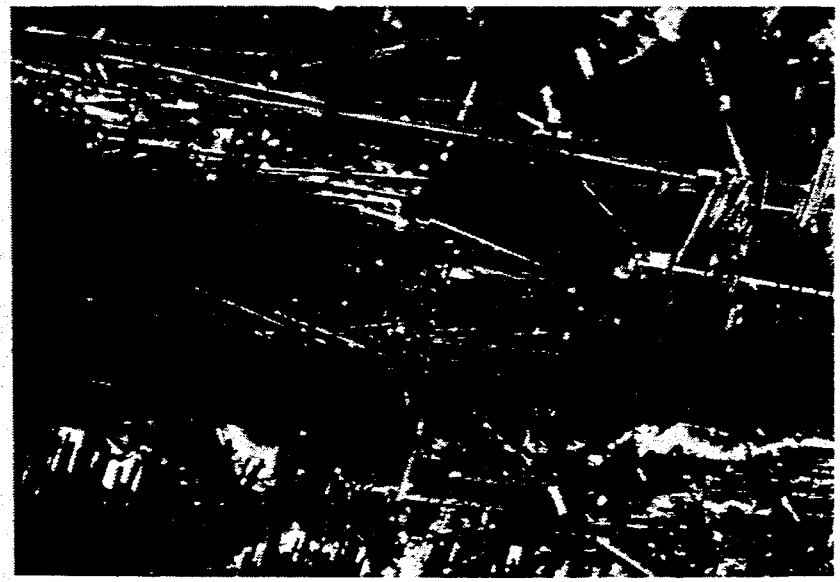
FIG. 9 is a SEM photograph at about 50× magnification of the , fracture surface of a tensile test specimen.

FIG. 9 is a scanning electron micrograph taken at about 200× magnification of a fracture surface which has been exposed as a result of a room temperature tensile test. Segments of the reinforcing fibers which have been partially pulled out of the surrounding matrix material are clearly visible.

Figure 10:
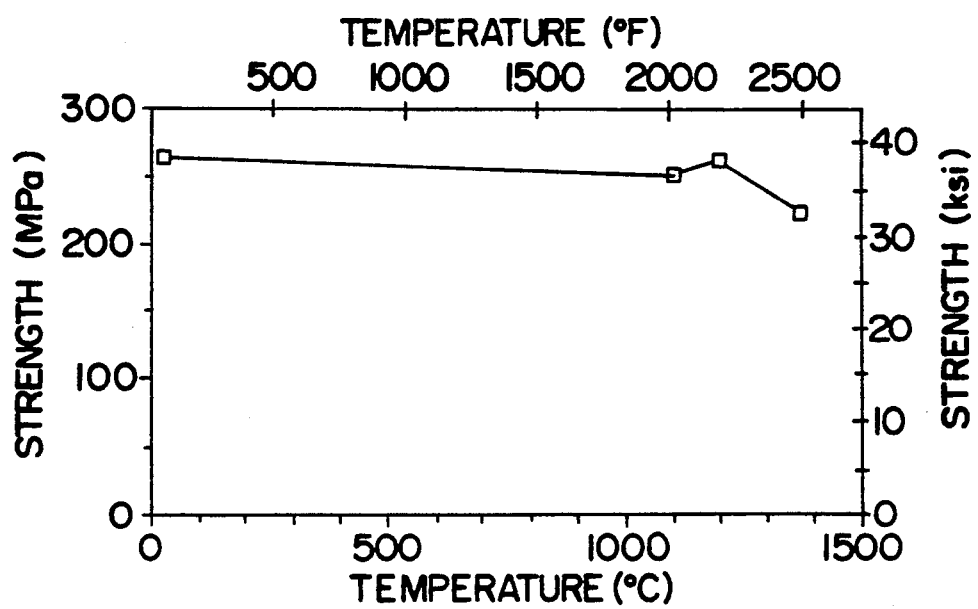
FIG. 10 shows tensile strength of a fiber-reinforced ceramic matrix composite vs. T(°C).

Tensile testing was also conducted at elevated temperatures on substantially the same material as was tested at room temperature using a similar test apparatus and substantially the same test method. The samples were tested in air at temperatures of about 1100° C., 1200° C., and about 1370° C. As shown in FIG. 10, the tensile strength at these temperatures was about 250, 260, and about 230 MPa, respectively. These data show that the fiber reinforced ceramic composite material retains substantially all of its room temperature strength up to a temperature of about 1200° C., and nearly all of its room temperature strength at a temperature of about 1370° C. The room temperature tensile strength for this group of samples was about 260 MPa.

EXAMPLE 8

This Example demonstrates the effect of rapid thermal cycling on the tensile strength of a fiber reinforced ceramic composite body at various temperatures.

A fabric preform 103 was made by stacking a plurality of layers of 8 harness satin weave (8 HSW) fabric and 12 harness satin weave (12 HSW) fabric made from NICALON ™ silicon carbide fiber (obtained from Dow Corning Corp., Midland, Mich.) on top of each other. The nomenclature describing the orientations of the fabrics is substantially the same as that used in Example 2 and depicted in FIGS. 5a, 5b and 5c.

The fabric preform of the present Example was made by stacking the layers of HSW fabric in the following sequence:

A first fabric layer comprising an 8 HSW fabric was rotated about 90° in the counterclockwise direction from the as-is position about an axis 93 perpendicular to the plane of the fabric and was placed on a supporting surface to start the fabric preform;

A second fabric layer comprising an 8 HSW fabric was placed on the first fabric layer in the as-is position so that the edges of the second fabric layer were substantially aligned with the edges of the first fabric layer;

A third fabric layer comprising a 12 HSW fabric was rotated about 90° in the counterclockwise direction from the as-is position about an axis 93 perpendicular to the plane of the fabric and was placed on the second fabric layer so that the edges of the third fabric layer were substantially aligned with the edges of the second fabric layer;

A fourth fabric layer comprising a 12 HSW fabric was placed on the third fabric layer in the as-is position so that the edges of the fourth fabric layer were substantially aligned with the edges of the third fabric layer;

A fifth fabric layer comprising a 12 HSW fabric was rotated about 90° in the counterclockwise direction from the as-is position about an axis 93 perpendicular to the plane of the fabric and was placed on the fourth fabric layer so that the edges of the fifth fabric layer were substantially aligned with the edges of the fourth fabric layer;

A sixth fabric layer comprising an 8 HSW fabric was placed on the fifth fabric layer in the as-is position so that the edges of the sixth fabric layer were substantially aligned with the edges of the fifth fabric layer;

A seventh fabric layer comprising an 8 HSW fabric was rotated about 90° in the counterclockwise direction from the as-is position about an axis 93 perpendicular to the plane of the fabric and was placed on the sixth fabric layer so that the edges of the seventh fabric layer were substantially aligned were substantially aligned with the edges of the sixth fabric layer, thus completing the rectangular fabric preform which measured about 7 inches (178 mm) in length by about 5 inches (127 mm) in width.

The fabric preform was clamped in substantially the same fixture as was described in Example 2 and depicted in FIG. 5e. The preform containment fixture 108 containing the fabric preform was placed into a reactor chamber of a refractory alloy steel chemical vapor infiltration apparatus having a graphite tube liner and having overall dimensions of about 8 feet (2.4 meters) in length by about 15.5 inches (394 mm) in inside diameter. The warp yarns of the first and seventh layers of the fabric preform were perpendicular to the gas flow direction within the chamber as well as being perpendicular to the longitudinal axis of the reactor chamber. The reactor chamber was closed and evacuated to less than about 0.04 inch (1 mm) of mercury (Hg). The reactor chamber was then heated to a temperature of about 820° C. Argon gas was flowed into the annulus region between the graphite liner and the steel reactor wall at a rate of about 850 standard cubic centimeters per minute (sccm). When the temperature within the reactor chamber reached about 820° C., a gas mixture comprising borontrichloride ($BCl_3$) flowing at about 700 sccm at a temperature of about 60° C. and ammonia ($NH_3$) flowing at about 1800 sccm was introduced into the reactor chamber while maintaining a total operating pressure of about 0.5 torr. After about 7 hours at a temperature of about 820° C., the gas mixture flowing into the reactor chamber was interrupted, the power to the furnace heating the reactor chamber was interrupted and the furnace and its contents were naturally cooled. At a temperature below about 200° C., the reactor chamber door was opened and the graphite containment fixture was removed, cooled and disassembled to reveal that the fibers of the fabric layers of the fabric preform were coated and that the fabric layers comprising the fabric preform were bonded together by a boron nitride coating. The boron nitride coating had a thickness of about 0.48 micron.

The boron nitride coated fabric preform was then stored in a vacuum desiccator until it was ready to be put back into the chemical vapor infiltration apparatus for additional coating.

For the application of this subsequent coating, the boron nitride coated and bonded fabric preform was placed back into the reactor chamber of the chemical vapor infiltration apparatus. In this instance, however, the warp yarns of the first and seventh layers of the fabric preform were parallel to the gas flow direction within the chamber, as well as being parallel to the longitudinal axis of the reactor chamber. The reactor chamber was closed and evacuated to about less than about 1 torr. Hydrogen gas was introduced into the reactor chamber at a flow rate of about 5000 standard cubic centimeters per minute (sccm). The reactor chamber was then heated to a temperature of about 935° C. Nitrogen gas was flowed through the annulus region at a rate of about 850 sccm. Once the temperature of the contents of the reactor chamber had substantially completely stabilized at about 935° C., about 1500 sccm of hydrogen were diverted away from direct entry into the reactor chamber and were first bubbled through a bath of methyltrichlorosilane (MTS) maintained at a temperature of about 45° C. before entering the reactor chamber. After about 20 hours at a temperature of about 935° C., the power to the furnace heating the reactor chamber was interrupted and the about 1500 sccm of hydrogen that was being directed through the MTS bath was again permitted to flow directly into the reactor chamber to re-establish a direct hydrogen gas flow rate of about 5000 sccm into the reactor chamber. After the reactor chamber had cooled substantially, the hydrogen flow rate was interrupted and the furnace and its contents were evacuated to less than 1 torr. The pressure within the reactor chamber was then brought back up to about atmospheric pressure with argon gas. After the reactor chamber had cooled to a temperature below about 200° C., the argon gas flow rate was interrupted and the reactor chamber door was opened. The graphite containment fixture was removed, cooled and disassembled to reveal that the boron nitride bonded fabric preform had been coated with a second layer of silicon carbide thereby forming a silicon carbide (SiC)-/boron nitride (BN)-coated fabric preform. The silicon carbide had a thickness of about 1.9 microns.

Growth of an alumina oxidation reaction product through the silicon carbide/boron nitride-coated fabric preform was then carried out in substantially the same manner as was described for Sample A of Example 3 to form a fiber reinforced ceramic composite body comprising a ceramic matrix comprising an aluminum oxide oxidation reaction product and a metallic constituent comprising some residual unreacted parent metal, with said ceramic matrix reinforced by the silicon carbide/boron nitride coated NICALON ™ silicon carbide fibers.

Once the ceramic composite body had been manufactured, at least a portion of the metallic constituent comprising the ceramic matrix was removed. This metal removal process was performed in substantially the same manner as was described in Example 2.

Tensile test specimens were machined from the fiber reinforced ceramic composite body in substantially the same manner as described tn Example 7. About half of the specimens were given a rapid thermal cycling treatment before tensile testing; the others were tested "as is". Specifically, the thermal cycling comprised subjecting each composite test specimen to about 150 thermal cycles, each thermal cycle comprising heating a test specimen from a starting temperature to a temperature of about 1200° C. in an argon atmosphere at a rate of about 40° C. per minute, holding at a temperature of about 1200° C. for about 2 minutes, and cooling back to the starting temperature at a rate of about 10° C. per minute. The starting temperature corresponded to the final testing temperature. The two sets of tensile test specimens were then tested in substantially the same manner as was described in the preceding Example at about room temperature and temperatures of about 1000° F. (538° C.), about 1500° F. (816° C.) and at about 2000° F. (1093° C.).

Figure 11:
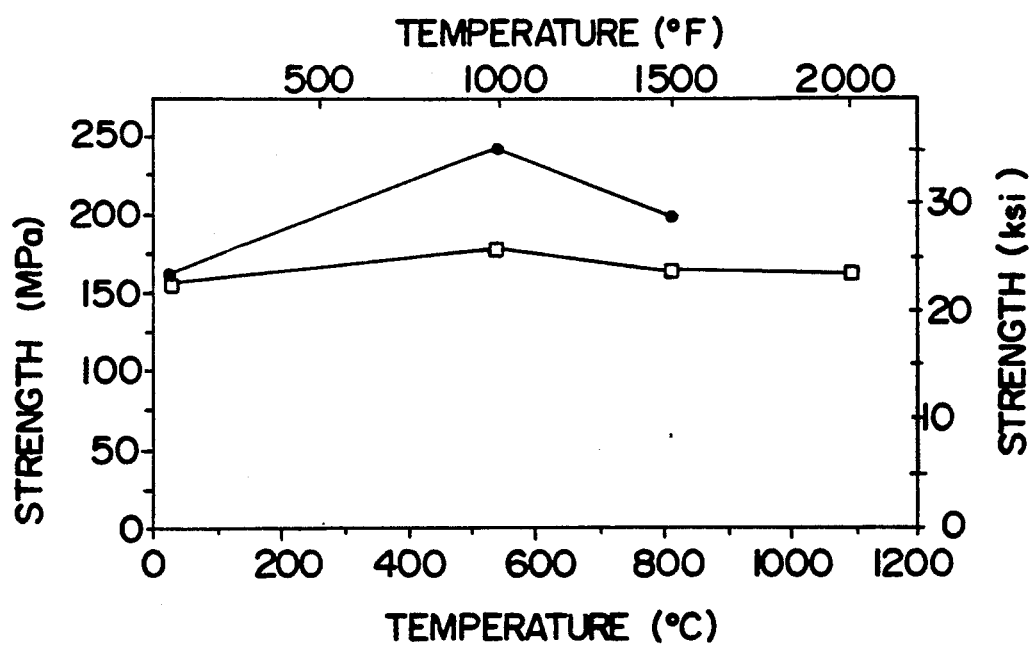
FIG. 11 shows tensile strength vs. temperature for thermally cycled and non-thermally cycled fiber ceramic matrix composite test specimens.

FIG. 11 shows the tensile strength as a function of test temperature for the two sets of composite test specimens. The data show that the thermally cycled composite test specimen experienced little loss in tensile strength compared to their counterparts which were not thermally cycled. The significance of this result is that the thermal cycling provided an opportunity for chemical reaction between the fiber, the fiber coatings and the surrounding matrix constituents. The thermal cycling operation also provided an opportunity for cracking due to thermal expansion mismatch. The lack of significant strength reduction indicates any microcracking induced by the thermal cycling was confined to the matrix material and, furthermore, that the ability of the fibers to pull out of the matrix under the applied tensile load was not substantially affected by the thermal cycling.

EXAMPLE 9

This Example demonstrates the high temperature mechanical performance of a fiber reinforced ceramic composite body under an applied load over a prolonged period of time in an oxidizing atmosphere.

The fiber reinforced ceramic composite body described herein was fabricated substantially in accordance with the methods outlined in Example 2.

In Example 7, it was demonstrated that at room temperature in a pure tensile test, a fiber reinforced ceramic matrix composite sample begins to deviate from linear stress/strain behavior at an applied stress of about 50–60 MPa, indicating that the matrix begins to microcrack at approximately this stress level. These microcracks may allow for oxygen in the surrounding atmosphere to find a path to the underlying NICALON ™ silicon carbide fiber and/or its SiC and BN coatings. Accordingly, stress rupture tests were conducted at various elevated temperatures in air at applied stresses above this 50–60 MPa microcracking threshold in order to evaluate the impact of matrix microcracking and subsequent oxygen ingress on the performance of the fiber reinforced ceramic composite body.

The stress rupture test specimen had substantially the same shape as that depicted in FIG. 7, with the exception that shoulders were machined into each end of the test specimen so that the sample could be gripped by a collar in the test fixture rather than clamped. Mica powder was used in the collar to cushion the contact zone between the collar and the shoulder portions of the stress rupture test specimen. The test specimen measured about 5.5 inches (140 mm) long overall by about 0.5 inch (13 mm) wide by about 0.12 inch (3 mm) thick. The gage portion of the test specimen measured about 2 inches (51 mm) in length by about 0.2 inches (5 mm) wide.

The tests comprised heating the samples to the desired test temperature and loading each specimen in tension to a desired stress and maintaining said stress at said temperature. The applied stress was increased in a step-wise manner. The unit length change of the specimen within the gage portion of the overall test specimen was monitored with a Model 1102 Zygo helium-neon laser (Zygo Corp., Middlefield, Conn.).

Figure 12:
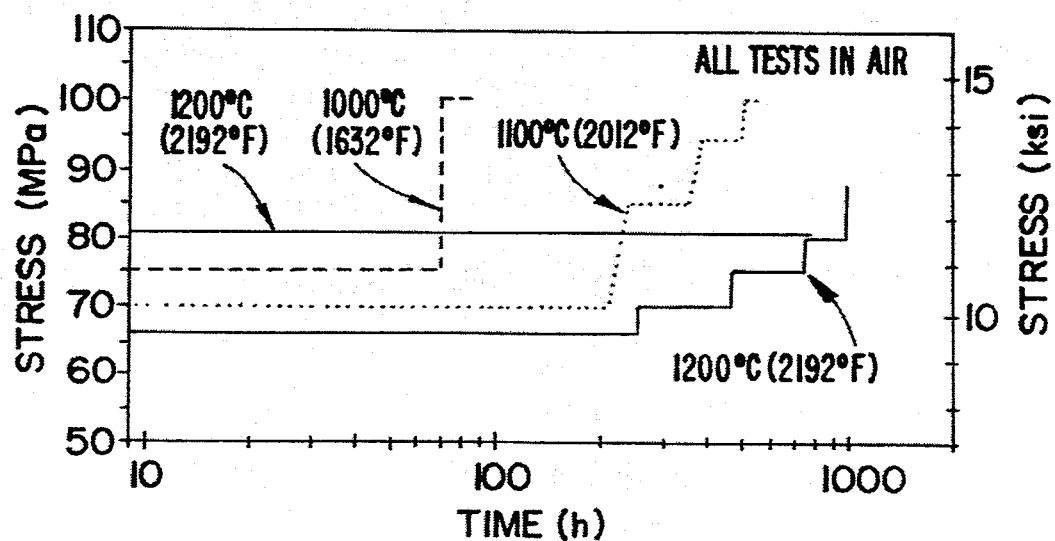
FIG. 12 shows results of stress rupture testing of NICALON ™ fiber reinforced $Al_2O_3$ at 1000°, 1100° and 1200° C.

The results of the stress rupture testing are presented for FIG. 12.

The particulars of the applied stress and the exposure times are presented below.

Sample G

The test fixture, comprising the Sample G test specimen with collars attached to each end, was loaded into a Model P-5 creep testing machine (SATEC Inc., Grove City, Penna.). A tensile stress of about 12.5 megapascals was applied to the test specimen using dead loading. A resistance heated air atmosphere furnace was positioned completely around the stress rupture test specimen and the furnace and the stress rupture sample contained within were heated from about room temperature to a temperature of about 1000° C. over a period of about 2 hours.

After the furnace chamber and its contents had reached a temperature of about 1000° C., the stress applied to the sample was increased to about 75 MPa. After maintaining an applied stress of about 75 MPa for about 70 hours, the applied stress to the sample was increased to about 100 MPa. After about 15 hours at a stress of about 100 MPa, the sample broke. The furnace chamber and its contents were allowed to cool naturally back down to about room temperature.

Sample H

The Sample H test fixture was placed into the creep testing machine as about room temperature and the Sample H stress rupture test specimen was heated in the surrounding resistance heated atmosphere furnace to a temperature of about 1000° C. over a period of about 3 hours under an applied stress of about 5 MPa. At a temperature of about 1000° C., the applied tensile stress on the sample was increased to about 70 MPa and the temperature inside the furnace chamber was increased to about 1100° C. over a period of about 1 hour. After maintaining the sample in tension at a stress of about 70 MPa at a temperature of about 1100° C. for about 210 hours, the applied stress was increased to about 83 MPa. After about an additional 6 hours, the stress was increased to about 85 MPa. After maintaining an applied stress of about 85 MPa on the sample for about 115 hours, the applied stress was increased to about 88 MPa. After maintaining an applied stress of 88 MPa for about 1.5 hours, the stress applied was increased to about 90 MPa. After maintaining an applied tensile stress of about 90 MPa for about 3 hours, the applied stress was increased to about 91 MPa. After maintaining an applied stress of about 91 MPa for about 1.5 hours, the stress was further increased to about 92 MPa. After maintaining an applied stress of about 92 MPa for about 1.3 hours, the applied stress was increased to about 95 MPa. After maintaining an applied stress of about 95 MPa on the sample for about 115 hours, the applied stress was increased to about 96 MPa. After maintaining an applied stress of about 96 MPa for about 3 hours, the applied stress was increased to about 97 MPa. After maintaining an applied stress of about 97 MPa for about 2 hours, the applied stress was increased to about 99 MPa. After maintaining an applied stress of about 99 MPa for about 1.5 hours, the applied stress was increased to about 100 MPa. After maintaining an applied stress of about 100 MPa for about 60 hours, the sample broke. The furnace chamber and its contents were thereafter furnace cooled from a temperature of about 1100° C. down to about room temperature.

Figure 13:
FIG. 13 is a SEM photograph at about 50× magnification of the fracture surface of a stress rupture tested specimen.

The fractured sample was recovered from the test chamber and the fracture surface was examined in the scanning electron microscope. FIG. 13 is an approximately 50× magnification scanning electron micrograph of a portion of the fracture surface. Direct comparison of FIG. 13 with the previous scanning electron micrograph of FIG. 9 shows much less fiber pull-out associated with this Sample H specimen than with the fracture surface of the Example 7 tensile test specimen. This decrease in the degree of fiber pull-out of the present stress rupture may suggest degradation of the fiber and/or one or more of its coatings over the 500+ hour duration of the stress rupture test. Conversely, the ability of this fiber reinforced ceramic matrix composite body to survive sustained exposure of this duration at a temperature of about 1100° C. at a stress level sufficient to expose the reinforcing fibers and/or their coatings to atmospheric oxygen may suggest the operation of a mechanism working to protect the NICALON ™ fibers from chemical reactions such as atmospheric oxidation.

Figure 14A:
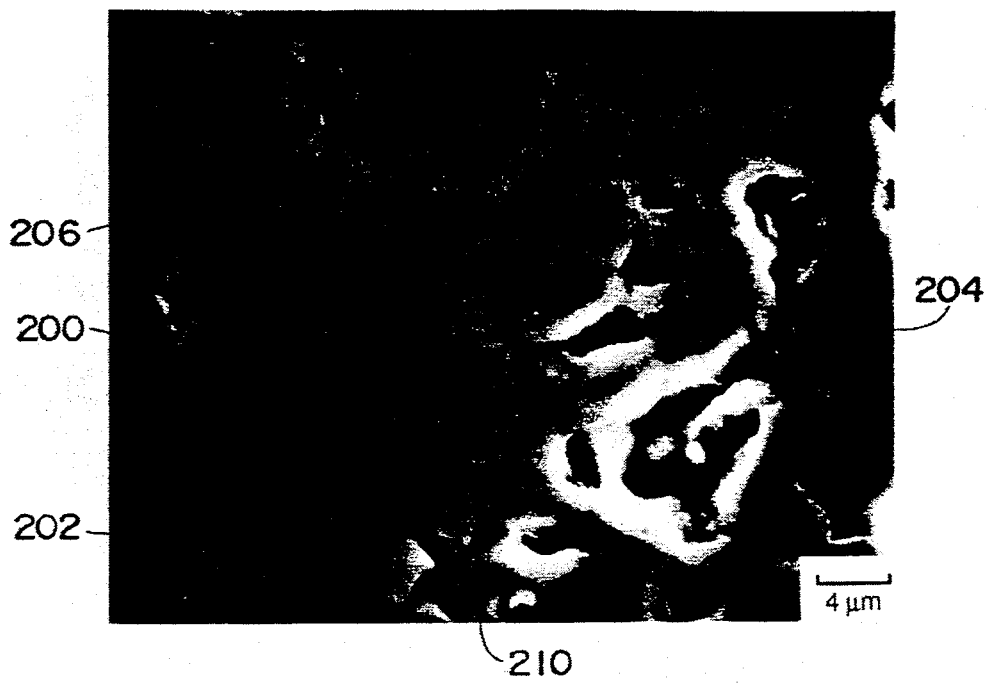
FIGS. 14a, 14b and 14c are scanning electron micrographs taken at about 2500×, 5000× and 10,000× magnification, respectively, of a polished cross-section of Sample H near the rupture surface.
Figure 14B:
Figure 14C:
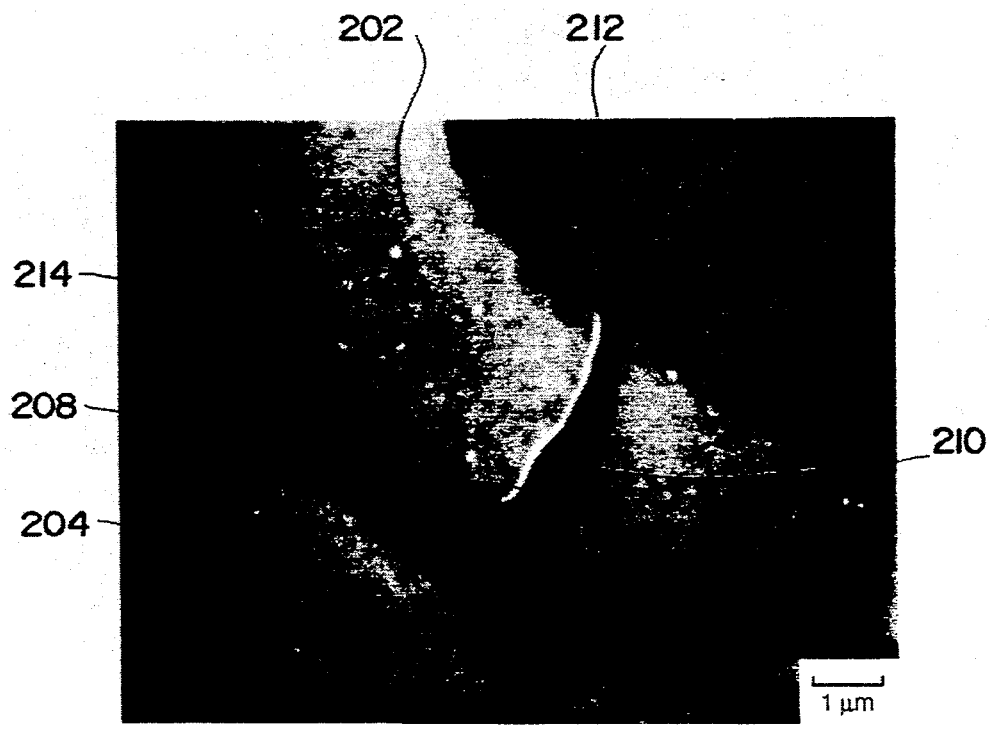

FIGS. 14a, 14b and 14c are scanning electron micrographs taken at about 2500×, 5000× and 10,000× magnification of a diamond polished cross-section of the Sample H stress rupture test specimen at a region very close to the fracture surface. Specifically, FIG. 14a shows a crack breaching at least the SiC coating, thus potentially exposing the NICALON ™ fiber and/or the BN debond coating to chemical reaction with reactant supplied from outside the fiber and its coatings. The higher magnification of this crack region shown in FIG. 14b reveals the presence of a substance at least partially filling the crack. Such a substance may comprise a reaction product of one or both of the SiC and BN coatings and/or the NICALON ™ fiber itself. The presence of such a reaction product may explain the apparent degradation of the fiber pull-out mechanism as well as the relative longevity of the material while under load at elevated temperature. Specifically, the at least partial refilling of a matrix microcrack after such a crack forms may serve to reduce the access of, for example, atmospheric oxygen to the reinforcing fibers and their coatings. FIG. 14c shows a different matrix microcrack in Sample H breaching an SiC coating.

This particular micrograph appears to show that the substance substantially filling the crack in the SiC coating also substantially comprises the space between the SiC coating and the NICALON TM fiber and the space between the SiC coating and the alumina oxidation reaction product.

Sample I

Sample E was stress rupture tested at a temperature of about 1200° C. The sample was loaded into the test rig in substantially the same manner as was described for Sample G. A tensile stress of about 12.5 MPa was applied to the test specimen at about room temperature. The furnace chamber and its contents were then heated from about room temperature to a temperature of about 1200° C. over a period of about 3 hours. At a temperature of about 1200° C., the applied stress was increased to about 66 MPa. After maintaining a temperature of about 1200° C. at an applied stress of about 66 MPa for about 256 hours, the applied stress was increased to about 70 MPa. After maintaining an applied stress of about 70 MPa at a temperature of about 1200° C. for about 216 hours, the applied stress was increased to about 75 MPa. After maintaining an applied stress of about 75 megapascals at a temperature of about 1200° C. for about 288 hours, the applied stress was increased to about 80 MPa. After maintaining an applied stress of about 80 MPa at a temperature of about 1200° C. for about 242 hours, the applied stress was increased to about 87 MPa. After about 1 hour at an applied stress of about 87 MPa at a temperature of about 1200° C., the sample broke.

Figure 15:
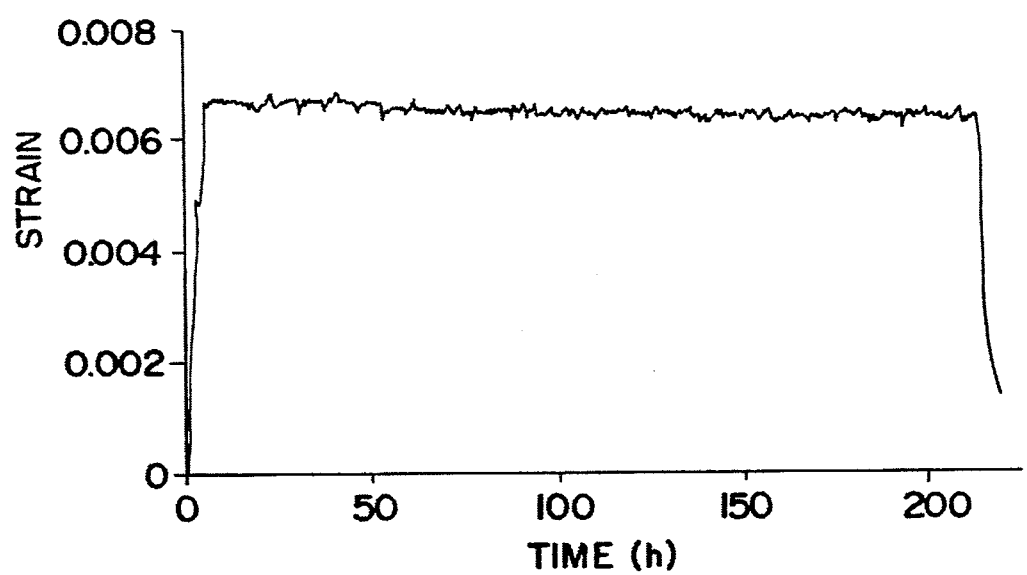
FIG. 15 shows total percent strain vs. time for a 1100° C. stress rupture specimen at about 70 MPa tensile load.

Concurrent with the stress rupture test, the strain of the stress rupture test specimens was monitored in the gage portion of the test specimen using the previously identified laser extensometer to help assess the creep behavior of the fiber reinforced ceramic matrix composite test specimen. Specifically, the first portion of the stress rupture for Sample H was repeated. Instead of testing the sample to failure, however, the temperature was decreased from about 1100° C. back down to about room temperature after about 210 hours at about 1100° C. under the approximately 70 MPa applied tensile stress. FIG. 15 shows the cumulative percent strain in the gage portion of the Sample H test specimen resulting from this creep test. The significance of FIG. 15 is that during the course of this approximately 210 hour creep test, Sample H shows essentially no change in elongation, indicating substantially no plastic deformation of the sample. Accordingly, no creep deformation of Sample H occurred under the described test conditions.

Similarly, no creep deformation was observed in the Sample I material which was stress rupture tested at a temperature of about 1200° C. under an applied load of about 70 MPa for about 216 hours. In contrast, it has been demonstrated in the art that creep deformation occurs in NICALON TM silicon carbide fibers at about 1200° C. Accordingly, the present results suggest that the present particular disposition of the reinforcing fibers in the applied coatings and the surrounding matrix material may provide enhanced creep resistance to the present fiber reinforced ceramic matrix composite system. Furthermore, the present results may suggest that the particular disposition of the reinforcing fibers in the present composite body provides protection to said fibers from degradation (e.g., chemical attack) such as from atmospheric gases (e.g., oxygen and nitrogen) at elevated temperatures.

EXAMPLE 10

This Example demonstrates the fabrication of a NICALON TM silicon carbide fiber reinforced alumina matrix composite, wherein the NICALON TM fibers are first CVD coated with dual boron nitride/silicon carbide coatings applied in alternating layers starting with boron nitride.

A fabric preform was made by stacking 8 layers of 12 harness satin weave (12 HSW) fabric made from NICALON TM silicon carbide fiber (obtained from Dow Corning Corp., Midland, Mich.) on top of each other substantially in accordance with the procedure described for Sample A of Example 3.

The fabric preform comprising the 8 layers of 12 HSW NICALON TM silicon carbide fabric were then placed into the graphite preform containment fixture 108 described in Example 2 and depicted in FIG. 5e in substantially the same manner as was described in Example 2. The preform containment fixture containing the fabric preform was then placed into the reactor chamber of a chemical vapor infiltration apparatus having an inside diameter of about 4.5 inches (114 mm) and a length of about 18 inches (457 mm). The warp yarns of the eighth layer of the fabric preform were parallel to the gas flow direction within the chamber as well as being parallel to the longitudinal axis of the reactor chamber. The reactor chamber was closed and evacuated to less than about 0.6 torr. The reactor chamber was then heated to a temperature of about 800° C. by means of inductive heating. When the temperature within the reactor chamber reached about 800° C., as indicated by a thermocouple contained therein, a gas mixture comprising ammonia ($NH_3$) flowing at about 400 standard cubic centimeters per minute (sccm) and boron trichloride ($BCl_3$) flowing at about 200 sccm was introduced into the reactor chamber while maintaining a total operating pressure of about 0.6 torr. After about 2 hours at a temperature of about 800° C., the gas mixture flowing into the reactor chamber was interrupted, the power to the furnace heating the reactor chamber was interrupted and the furnace and its contents were naturally cooled. After sufficient cooling (e.g., less than about 200° C.), the reactor chamber door was opened and the preform containment fixture was removed, cooled and disassembled to reveal that the fibers of the fabric layers of the fabric preform were coated with boron nitride, and furthermore, that the fabric layers comprising the fabric preform were bonded together by the boron nitride coating. The boron nitride coating thickness on the fibers was about 0.33 microns.

The boron nitride coated and bonded fabric preform was stored in a vacuum desiccator pending subsequent coating.

Next, a silicon carbide coating was applied to the fibers of the fabric preform.

The boron nitride coated and bonded fabric preform was placed back into the reactor chamber of the above-described chemical vapor infiltration apparatus. Because the fiber preform was self-bonding at this stage, the graphite containment fixture was unnecessary. The orientation of the fabric preform, however, was substantially the same as that employed for depositing the boron nitride coating onto the fibers in the previous deposition reaction.

The reactor chamber door was closed and the reactor chamber and its contents were evacuated to less than about 0.3 torr. The reactor chamber and its contents were then heated from about room temperature to a temperature of about 925° C. at a rate of about 50° C. per minute. Hydrogen gas was then introduced into the reactor chamber at a flow rate of about 750 standard cubic centimeters per minute (sccm). When the reactor chamber and its contents had equilibrated at a temperature of about 925° C., as indicated by a thermocouple contained therein, additional hydrogen flowing at a rate of about 750 sccm was bubbled through a liquid bath of methyltrichlorosilane (MTS) maintained at a temperature of about 21° C., after which this gas was introduced into the reactor chamber. The pressure in the reactor chamber was stabilized at about 11 torr. After maintaining these conditions of temperature, pressure and gas flow rate for about 3 hours, power to the resistance heated furnace which heated the reactor chamber was interrupted and the about 750 sccm of hydrogen that was being directed through the liquid MTS bath was diverted around the MTS bath and permitted to flow directly into the reactor chamber, thus establishing a direct hydrogen gas flow rate of about 1500 sccm into the reactor chamber. After the temperature of the reactor chamber and its contents had dropped to about 800° C., the resistance heated furnace was re-energized and the temperature of the reactor chamber and its contents was stabilized at about 800° C.

Another boron nitride coating was then deposited on the coated fiber. Specifically, the flow of hydrogen gas into the reactor was interrupted and the reactor chamber and its contents were then evacuated to less than about 0.3 torr. Ammonia ($NH_3$) and borontrichloride ($BCl_3$) gases were then introduced into the reactor chamber in substantially the same manner as was described previously at an operating pressure of about 0.6 mm torr so as to deposit a coating of boron nitride onto the coated fibers comprising the fabric preform. After depositing boron nitride for about 1.5 hours at a temperature of about 800° C. and at a pressure of about 0.6 torr, the gas mixture flowing into the reactor chamber was interrupted. The temperature of the reactor chamber and its contents was raised from about 800° C. back up to about 925° C. Hydrogen gas was then reintroduced into the furnace chamber at a flow rate of about 750 sccm.

When the temperature of the reactor chamber and its contents had stabilized at about 925° C., a final coating of silicon carbide was deposited onto the coated NICALON TM silicon carbide fibers comprising the fabric preform.

Specifically, substantially the same procedure was employed in depositing this second silicon carbide coating as was employed in depositing the first silicon carbide coating described earlier, with the exception that the reactor chamber and its contents were maintained at a temperature of about 925° C. at an operating pressure of about 11 torr for about 20 hours.

After depositing this second silicon carbide coating for about 20 hours, the power to the furnace heating the reactor chamber was interrupted and the about 750 sccm of hydrogen which was bubbled through the liquid MTS bath was instead sent directly into the reactor chamber without first being routed through the MTS bath. After the furnace chamber and its contents had cooled down to about less than about 200° C., the flow of hydrogen gas into the reactor chamber was interrupted and the reactor chamber was evacuated to less than about 0.3 torr. The pressure in the furnace chamber was then returned to atmospheric pressure using argon gas. When the furnace chamber had reached substantially atmospheric pressure, the chamber was opened and the coated fabric preform was removed from the reactor chamber.

An alumina oxidation reaction product was grown into the coated fiber preform in substantially the same manner as was described for Sample A of Example 3 to form a ceramic composite body comprising NICALON TM silicon carbide fibers coated with, in order from interior to exterior, about 0.2 micron boron nitride, about 1.83 microns silicon carbide, about 0.2 micron boron nitride and about 1.93 microns silicon carbide as measured along the radius of the fiber cross-section, said coated NICALON TM fibers reinforcing a ceramic matrix, said ceramic matrix comprising an alumina oxidation reaction product and a metallic constituent comprising some residual unreacted parent metal.

Figure 16A:
FIGS. 16a and 16b are scanning electron micrographs taken at about 3500× magnification of a polished cross-section of the NICALON ™ fiber reinforced alumina matrix composite produced in accordance with Example 10.
Figure 16B:
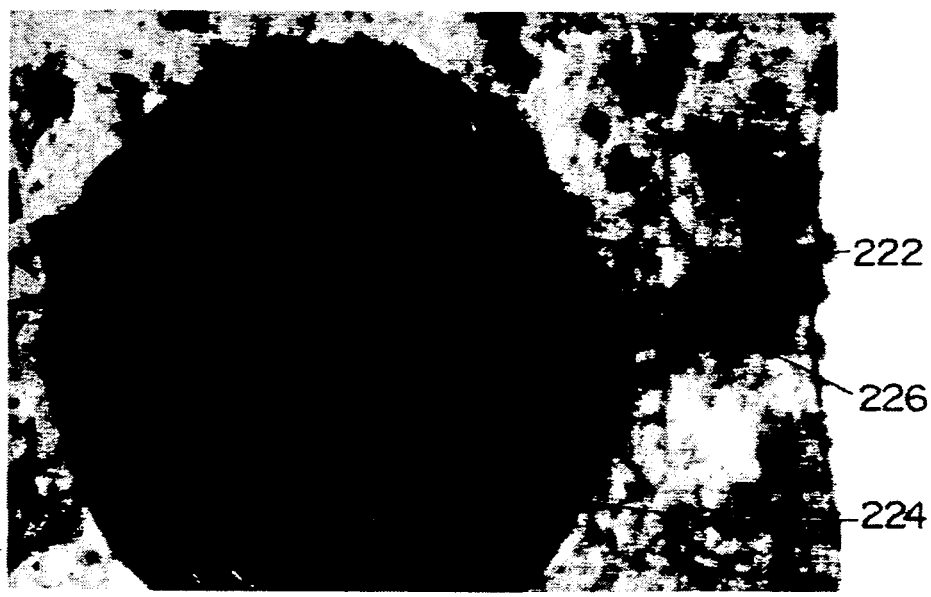

Flexural strength test specimens were machined and strength tested at about room temperature in substantially the same manner as was described in Example 2. FIGS. 16a and 16b are a scanning electron micrographs at about 3500× magnification of a polished cross-section of the fracture surface of the fiber reinforced ceramic composite test specimen. In particular, FIG. 16a shows a crack entering the outer silicon carbide layer and exiting without going through the inner silicon carbide layer. Not all of the cracks displayed this behavior, however, as evidenced by FIG. 16b which shows a crack entering through both outer and inner silicon carbide coating layers and subsequently exiting through both silicon carbide layers.

Demonstration that a NICALON TM fiber reinforced ceramic composite whose NICALON TM fibers have coated thereon double layers of boron nitride and silicon carbide can fracture or debond between the inner and outer silicon carbide layers may suggest that those fibers where this behavior occurs will be more resistant to chemical degradation from external reactants at elevated temperatures because such fibers are still protected by one group of boron nitride and silicon carbide coatings.

EXAMPLE 11

This Example demonstrates that a coating of boron nitride followed by a coating of silicon carbide on a NICALON TM fiber provide some protection from oxidation at elevated temperatures. This Example also shows that the application of an additional set of boron nitride and silicon carbide coatings supplied over the first set provide significantly greater oxidation protection.

Thermogravimetric analyses were performed on Samples J, K, L and M described below. Each test comprised placing a sample having a mass of several tens to several hundreds of milligrams into an alumina crucible which in turn was placed into the test chamber of a Model SPA 409 Netzsch microbalance (Netzsch Inc., Exton, Pa.). The chamber was sealed and substantially pure oxygen gas was introduced into the test chamber at a flow rate of about 200 standard cubic centimeters per minute (sccm). The temperature of the sample was then increased from substantially room temperature to a temperature of about 1200° C. at a rate of about 200° C. per hour. After maintaining a temperature of about 1200° C. for about 24 hours, the temperature was decreased to about room temperature at a rate of about 200° C. per hour. The flow of the substantially ent invention embraces many combinations and variations other than those exemplified.

TABLE IV

Weight Gains of Coated and Uncoated NICALON ™ Fibers and CVI SiC/BN Coatings on Exposure to Air at 1200° C. for 24 Hours

| Sample ID | Description | % Weight Gain | | | |
|---|---|---|---|---|---|
| | | Based on Initial Sample Wt. | Based on Initial Fiber Wt. | Based on CVI BN Coating Wt. | Based on SiC/BN Coating Wt. |
| J | NICALON ™ Fiber | 1.4 | 1.4 | — | — |
| K | BN Coated NICALON ™ Fiber | 13.63 | 15.39 | 119.53 | — |
| L | SiC/BN Coated NICALON ™ Fiber | 0.47 | 2.0 | 14.81 | 0.65 |
| M | SiC/BN/SiC/BN Coated NICALON ™ Fiber | 0.08 | — | — | — | pure oxygen gas was interrupted. The microbalance continuously monitored and recorded the mass of the test sample throughout the duration of the test.

Sample J

Sample J comprised NICALON ™ fibers in the "as-received" condition.

Sample K

Sample K comprised NICALON ™ fibers which were coated with boron nitride substantially in accordance with the method described in Example 10.

Sample L

Sample L comprised NICALON ™ fibers which were coated with a layer of boron nitride and a layer of silicon carbide substantially as described in Example 10.

Sample M

Sample M comprised NICALON ™ fibers which were coated with layers of boron nitride, silicon carbide, additional boron nitride and additional silicon carbide substantially as described in Example 10.

Table IV shows the percentage weight gain for each of the four samples as a function of the initial sample weight (e.g., fiber weight plus the weight of any coatings), the weight only of initial NICALON ™ fiber, the weight only of the boron nitride coating, and the weights of the silicon carbide and boron nitride coatings. For Sample M only the percentage weight increase in terms of the initial sample weight was measured.

The data show that coating a NICALON ™ fiber with both boron nitride and silicon carbide substantially reduces the elevated temperature oxidation of the fiber in oxygenated environments, as evidenced by the weight increases of 0.47 and 0.65 percent, respectively, compared to the weight increase of 1.4 percent for an uncoated NICALON ™ fiber. Moreover, the Table appears to indicate that the best oxidation resistance (e.g., the least amount of weight increase) may occur when a dual duplex coating of boron nitride and silicon carbide (e.g., four layers in all) is applied to the NICALON ™ fiber. This result may suggest that this dual duplex coating not only protects the NICALON ™ fiber but also protects the underlying boron nitride/silicon carbide coatings and in particular, the inner boron nitride debond coating.

Although only a few exemplary embodiments of the invention have been described in detail above, those skilled in the art would readily appreciate that the present invention embraces many combinations and variations other than those exemplified.

What is claimed is:

1. A coated ceramic filler material adapted for use as a reinforcing component in a composite comprising a ceramic matrix embedding said filler material, said coated ceramic filler material comprising a ceramic filler material having a plurality of superimposed coating assemblies, said plurality comprising an interior assembly at least one assembly exterior to said interior assembly, each of said assemblies comprising a first coating and at least one coating exterior to said first coating and in substantially continuous contact with said first coating; a boundary between said ceramic filler material and said coating in contact with said filler material forming a first zonal junction, the boundary between said ceramic matrix and said coating in contact with said ceramic matrix forming a second zonal junction, and each of the boundaries between adjacent coatings forming additional zonal junctions; and the zonal shear strength of at least one of the zonal junctions being weak relative to a remainder of the other zonal junctions to permit (1) debonding of said filler material on application of stress prior to fracture of said filler material and (2) pull-out of said filler material upon fracture of said filler material.

2. The coated ceramic filler material of claim 1, wherein said ceramic matrix comprises an oxidation reaction product of a molten parent metal and an oxidant.

3. The coated ceramic filler material of claim 1, wherein an outermost coating protects said first coating and said filler material from degradation during the formation of said ceramic matrix.

4. The coated ceramic filler material of claim 1, wherein the zonal junction between said ceramic filler and said first coating comprises said relatively weak zonal junction having a shear strength which permits debonding and pull-out.

5. The coated ceramic filler material of claim 1, wherein the zonal junction between an outermost coating and the ceramic matrix comprises said relatively weak zonal junction having a shear strength which permits debonding and pull-out.

6. The coated ceramic filler material of claim 1, wherein the zonal junction between said coatings of said exterior assembly comprises said relatively weak zonal junction having a shear strength which permits debonding and pull-out.

7. The coated ceramic filler material of claim 1, wherein said ceramic filler comprises a material selected from the group consisting of silicon carbide, Si—C—O—N compounds, alumina, boron carbide, mullite, zirconia, borosilicate glasses, silicon nitride, silica, titanium nitride, aluminum nitride, and boron nitride, said first coating comprises a material selected from the group consisting of boron nitride, titanium carbide, silicon, calcium silicate, calcium sulfate and carbon, and said at least one exterior coating comprises a material selected from the group consisting of silicon carbide, silicon, silica, alumina, zirconia, silicon nitride, zirconium nitride, titanium nitride, and aluminum nitride.

8. The coated ceramic filler material of claim 1, wherein at least one of said at least one exterior coating of said exterior assembly is substantially nonreactive in an oxidizing atmosphere with molten metals selected from the group consisting of aluminum, magnesium, titanium, zirconium, tin, silicon, and alloys thereof.

9. A method for producing a self-supporting ceramic composite comprising a ceramic matrix embedding a coated filler material, said method comprising:
   providing a permeable mass comprising at least one filler material;
   providing a first coating in substantially continuous contact with said at least one filler material;
   providing at least one additional coating in substantially continuous contact with said first coating on said ceramic material to form a multiply coated filler material comprising a plurality of coatings terminating at an exterior coating, the boundaries between each of said filler material, said coatings and said ceramic matrix thereby forming at least three zonal junctions, and the zonal shear strength of one of said three zonal junctions is weak relative to the other zonal junctions, and said exterior coating at least partially protecting from chemical degradation said filler and said first coating;
   positioning a parent metal adjacent to said permeable mass comprising said multiply coated filler material and orienting said parent metal and said permeable mass relative to each other so that formation of an oxidation reaction product will occur in a direction towards and into said permeable mass of multiply coated filler material;
   heating said parent metal to a temperature above its melting point but below the melting point of its oxidation reaction product to form a body of molten parent metal, and reacting said body of molten parent metal with an oxidant at said temperature to form said oxidation reaction product, and at said temperature maintaining at least a portion of said oxidation reaction product in contact with and extending between said body of molten parent metal and said oxidant, to draw said molten parent metal through said oxidation reaction product towards said oxidant and towards and into the adjacent permeable mass so that fresh oxidation reaction product continues to form within said mass of multiply coated filler material at an interface between said oxidant and previously formed oxidation reaction product; and
   continuing said reacting for a time sufficient to embed at least a portion of said multiply coated filler material within said oxidation reaction product.

10. The coated ceramic filler material of claim 1, wherein said coatings are each about 0.2 to 5 microns in thickness, and the cumulative thickness of said coatings on said ceramic filler material is no more than about 20 microns.

11. A self-supporting ceramic composite comprising a ceramic matrix having a ceramic filler material incorporated therein and adapted for use as a reinforcing component in said composite, wherein said ceramic matrix embeds said ceramic filler material, said ceramic filler material having a plurality of superimposed coatings, said superimposed coatings comprising at least two debond coatings and at least one protective coating disposed between said ceramic matrix and at least one of said at least two debond coatings:
   the boundaries between each of said ceramic filler material, said superimposed coatings and said ceramic matrix forming zonal junctions; and
   the zonal shear strength of at least one of the zonal junctions adjacent to at least one of said at least two debond coatings being weak relative to a remainder of the zonal junctions to (1) permit debonding of at least said filler material on application of stress prior to fracture of said filler material and (2) pullout of at least said filler material upon fracture of said filler material.

12. The coated ceramic filler material of claim 1, wherein said first coating in contact with said ceramic filler material comprises a substantially continuous coating comprising boron nitride and wherein a second coating comprising silicon carbide is superimposed over and is substantially continuous with said first coating.

13. The coated ceramic filler material of claim 1, wherein said filler material comprises a material selected from the group consisting of whiskers, fibers or staple.

14. The coated ceramic filler material of claim 2, wherein said first coating of said interior assembly is non-wettable by said parent metal during the formation of said ceramic matrix.

15. The coated ceramic filler material of claim 12, wherein said ceramic filler material comprises silicon carbide or Si—C—O—N compounds.

16. The ceramic composite of claim 11, wherein said ceramic matrix comprises an oxidation reaction product of a molten parent metal and an oxidant, further wherein said coating adjacent to said ceramic matrix is wettable by said molten parent metal during formation of said ceramic matrix.

17. The ceramic composite of claim 11, wherein said coating adjacent to said ceramic matrix protects said filler material and said coating adjacent to said filler material from degradation during formation of said ceramic matrix.

18. The ceramic composite of claim 16, wherein the parent metal comprises aluminum and the oxidant comprises air.

19. The ceramic composite of claim 16, wherein said oxidation reaction product comprises a metal boride.

20. The ceramic composite of claim 19, wherein said parent metal comprises aluminum.

21. The self-supporting ceramic composite of claim 11, wherein at least one of said at least one protective coating is disposed between said at least two debond coatings.

* * * * *